US008854708B2

(12) United States Patent
Ninomiya et al.

(10) Patent No.: US 8,854,708 B2
(45) Date of Patent: Oct. 7, 2014

(54) IMAGE SENSING DEVICE FOR SENSING AN IMAGE ON A RECORDING MEDIUM

(75) Inventors: Kota Ninomiya, Kanagawa (JP); Masao Ito, Kanagawa (JP); Fumio Furusawa, Kanagawa (JP); Katsuhiko Nakaie, Kanagawa (JP); Junichi Morooka, Kanagawa (JP); Shusaku Yokota, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 590 days.

(21) Appl. No.: 13/115,628

(22) Filed: May 25, 2011

(65) Prior Publication Data

US 2012/0099873 A1 Apr. 26, 2012

(30) Foreign Application Priority Data

Oct. 22, 2010 (JP) ................................. 2010-238008

(51) Int. Cl.
*H04N 1/46* (2006.01)
*G03G 15/00* (2006.01)
*G03G 15/04* (2006.01)

(52) U.S. Cl.
CPC ........ *G03G 15/5041* (2013.01); *G03G 15/5062* (2013.01); *G03G 15/04036* (2013.01)
USPC .......................................................... 358/505

(58) Field of Classification Search
None
See application file for complete search history.

(56) References Cited

U.S. PATENT DOCUMENTS 5,528,050 A * 6/1996 Miller et al. .................. 250/585
2004/0008386 A1* 1/2004 Shiraishi ....................... 358/474
2005/0122544 A1* 6/2005 Mizuhashi et al. .......... 358/1.18
2009/0153917 A1* 6/2009 Shiraishi ....................... 358/474

FOREIGN PATENT DOCUMENTS

JP 2010-10979 A 1/2010
JP 2010-114498 A 5/2010

OTHER PUBLICATIONS

Japanese Office Action, dated May 7, 2014, issued in corresponding Japanese Patent Application No. 2010-238008. English translation.

* cited by examiner

*Primary Examiner* — Jeremiah Bryar
(74) *Attorney, Agent, or Firm* — Sughrue Mion, PLLC

(57) ABSTRACT

A sensing device including: a sensing section having an illuminating section that illuminates light and a light-receiving section that receives reflected light of light illuminated from the illuminating section, the sensing section sensing an image on a recording medium; a housing that accommodates the illuminating section; a covering member covering the housing, that is freely installed at and removed from the housing, having a transmitting member through which the light from the illuminating section is transmitted; and a setting section disposed at an opposite side to a housing side with respect to the covering member, the setting section being freely installed at and removed from the housing, and having a setting surface that sets a position at which the recording medium reflects light, wherein, at a positioning portion of the setting section, the covering member is positioned at least in a direction perpendicular to the setting surface, is provided.

8 Claims, 19 Drawing Sheets

IMAGE SENSING DEVICE FOR SENSING AN IMAGE ON A RECORDING MEDIUM

CROSS-REFERENCE TO RELATED APPLICATIONS

This application is based on and claims priority under 35 USC 119 from Japanese Patent Application No. 2010-238008 filed on Oct. 22, 2010.

BACKGROUND

1. Technical Field

The present invention relates to a sensing device, and to an image forming device that is equipped with the sensing device.

2. Related Art

An image reading section (sensing device) provided in an image forming device has been disclosed. The image reading section is disposed at the downstream side of an image forming section on a sheet conveying path and that reads the image on the sheet that was subjected to image formation at the image forming section. An opposing member, that has plural reference surfaces and is rotatably provided, and an image reading portion, that reads the reference surfaces provided at the opposing member, are provided at the image reading section.

SUMMARY

According to an aspect of the invention, there is provided a sensing device including: a sensing section having an illuminating section that illuminates light toward a conveying path on which a recording medium is conveyed, and a light-receiving section that receives reflected light of light illuminated from the illuminating section, the sensing section sensing an image on the recording medium that is conveyed on the conveying path; a housing that accommodates the illuminating section; a covering member, that is freely installed at and removed from the housing, having a transmitting member through which the light illuminated from the illuminating section is transmitted, the covering member covering the housing; and a setting section disposed at a side, of the covering member, opposite a side at which the housing is disposed, the setting section being freely installed at and removed from the housing, and having a setting surface that sets a position at which the recording medium reflects light, wherein, at a positioning portion of the setting section, the covering member is positioned at least in a direction perpendicular to the setting surface.

BRIEF DESCRIPTION OF THE DRAWINGS

An exemplary embodiment of the present invention will be described in detail based on the following figures, wherein.

DETAILED DESCRIPTION

Examples of a sensing device and an image forming device relating to an exemplary embodiment of the present invention are described in accordance with FIG. 1 through FIG. 19.

(Overall Structure)

Figure 1:
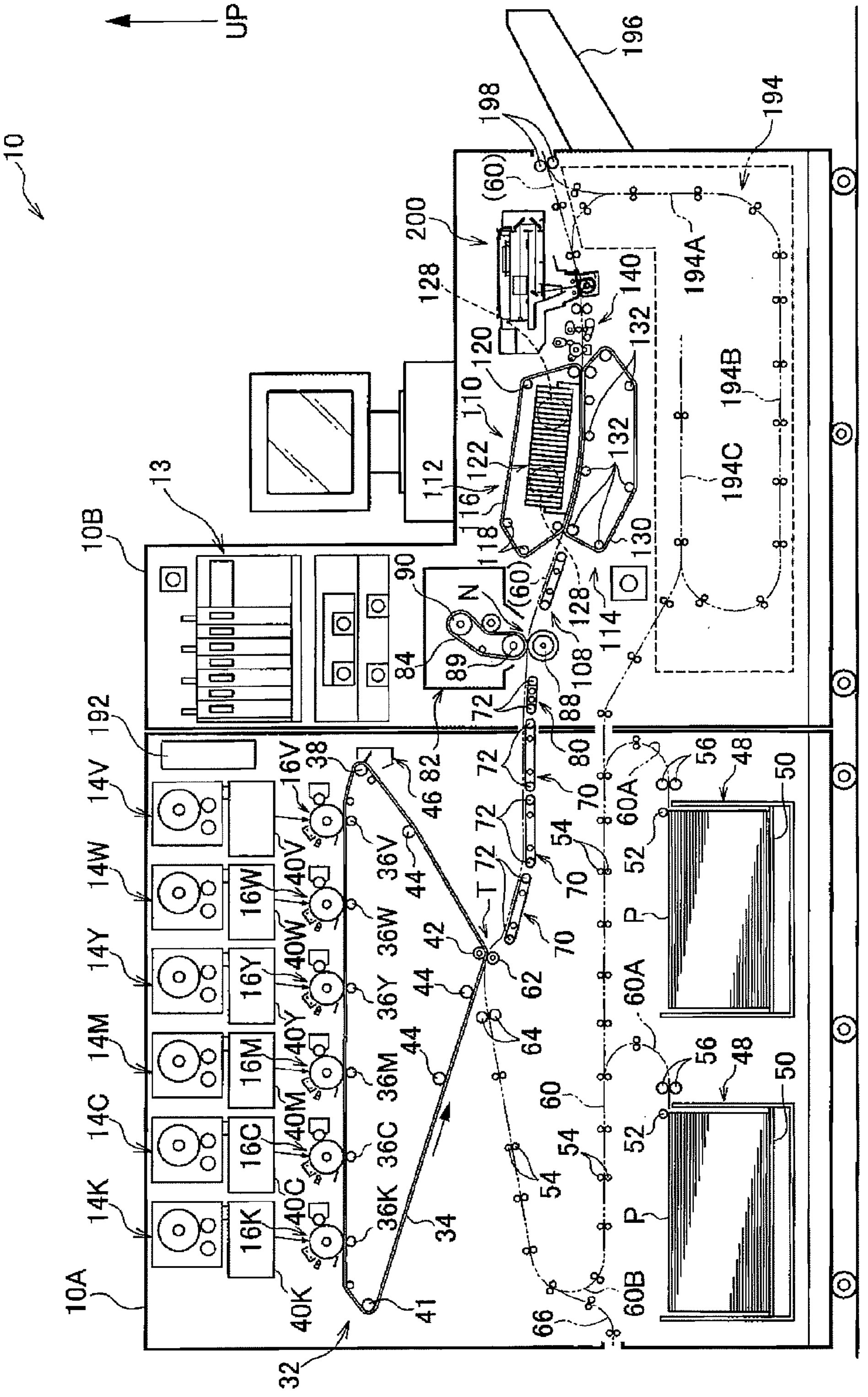
FIG. 1 is a schematic structural drawing showing an image forming device relating to the exemplary embodiment of the present invention.

An image forming device 10 relating to the present exemplary embodiment forms full-color images or black-and-white images. As shown in FIG. 1, the image forming device 10 has a first housing 10A in which is accommodated a first processing section that structures a "–" side (the left side in FIG. 1) portion in the horizontal direction, and a second housing 10B that is connected to the first housing 10A so as to be able to be separated therefrom, and in which is accommodated a second processing section that structures a "+" side (the right side in FIG. 1) portion in the horizontal direction.

An image signal processing section 13, that carries out image processings on image data that is sent-in from external devices such as computers or the like, is provided in the upper portion of the second housing 10B.

On the other hand, toner cartridges 14V, 14W, 14Y, 14M, 14C, 14K, that accommodate respective toners of a first special color (V), a second special color (W), yellow (Y), magenta (M), cyan (C), black (K), are replaceably provided in the upper portion of the first housing 10A along the horizontal direction.

Note that the first special color and the second special color are appropriately selected from colors (including transparent) other than yellow, magenta, cyan and black. Further, in the following description, when differentiating among the first special color (V), the second special color (W), yellow (Y), magenta (M), cyan (C) and black (K) for the respective structural parts, one of the letters V, W, Y, M, C, K is appended to the reference numeral. If not differentiating among the first special color (V), the second special color (W), yellow (Y), magenta (M), cyan (C) and black (K), the letter V, W, Y, M, C, K, is omitted.

Six image forming units 16 corresponding to the toners of the respective colors are provided along the horizontal direction beneath the toner cartridges 14, so as to correspond to the respective toner cartridges 14.

Figure 2:
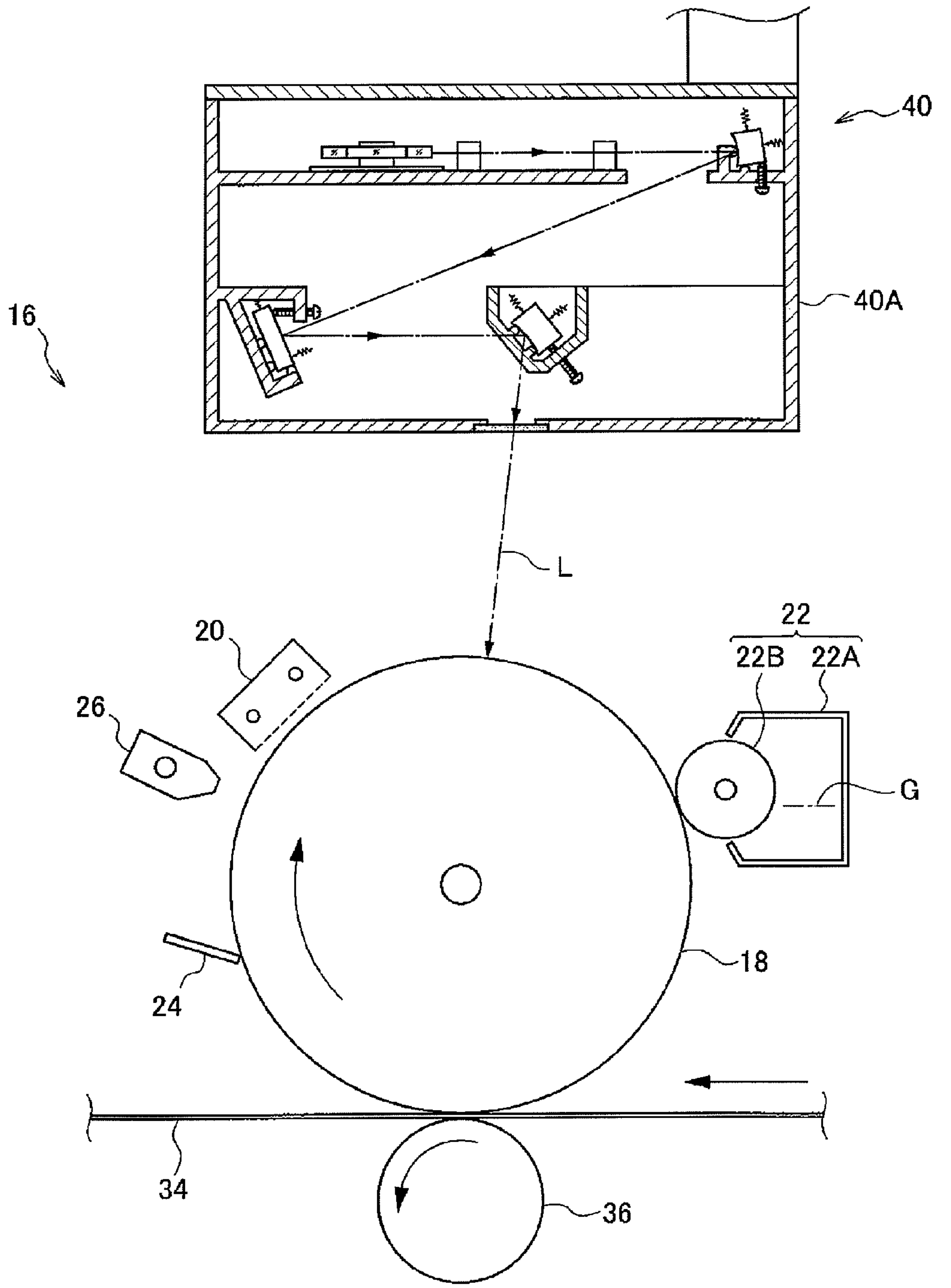
FIG. 2 is a sectional view showing an image forming unit that is employed in the image forming device relating to the exemplary embodiment of the present invention.

An exposure device 40, that is provided for each of the image forming units 16, is structured so as to receive, from the image signal processing section 13, image data that has been subjected to image processings by the image signal processing section 13, and illuminates a light beam L, that is modulated in accordance with this image data, onto an image holding body 18 that is described hereafter (refer to FIG. 2).

As shown in FIG. 2, each of the image forming units 16 has the image holding body 18 that is driven and rotated in one direction (clockwise direction in FIG. 2). Due to the light beam L being illuminated from the respective exposure device 40 onto the respective image holding body 18, an electrostatic latent image is formed on the image holding body 18.

Provided at the periphery of each of the image holding bodies 18 are: a corona discharge type (non-contact charging type) scorotron charger 20 that charges the image holding body 18; a developing device 22 that develops, by a developer, the electrostatic latent image that is formed on the image holding body 18 by the exposure device 40; a blade 24 serving as a removing member that removes the developer remaining on the image holding body 18 after transfer; and a charge-removing device 26 that carries out charge removal by illuminating light onto the image holding body 18 after transfer.

The scorotron charger 20, the developing device 22, the blade 24 and the charge-removing device 26 are disposed so as to face the surface of the image holding body 18, in that order from the rotating direction upstream side of the image holding body 18 toward the downstream side.

The developing device 22 is structured to include a developer accommodating member 22A that accommodates a developer G containing toner, and a developing roller 22B that supplies, to the image holding body 18, the developer G that is accommodated in the developer accommodating member 22A. The developer accommodating member 22A is connected to the toner cartridge 14 (see FIG. 1) through a toner supply path (not shown), and toner is supplied from the toner cartridge 14.

As shown in FIG. 1, a transfer section 32 is provided beneath the respective image forming units 16. The transfer section 32 is structured to include an intermediate transfer belt 34 that is annular and contacts the respective image holding bodies 18, and primary transfer rollers 36 serving as primary transfer members that transfer, in a superposed manner and onto the intermediate transfer belt 34, the toner images that are formed on the respective image holding bodies 18.

The intermediate transfer belt 34 is trained around a drive roller 38 that is driven by an unillustrated motor, a tension imparting roller 41 that imparts tension to the intermediate transfer belt 34, an opposing roller 42 that opposes a secondary transfer roller 62 that will be described hereinafter, and plural training rollers 44. The intermediate transfer belt 34 is circulated in one direction (counterclockwise direction in FIG. 1) by the drive roller 38.

The respective primary transfer rollers 36 are disposed so as to oppose the image holding bodies 18 of the respective image forming units 16, with the intermediate transfer belt 34 nipped therebetween. A transfer bias voltage, that is the opposite polarity of the toner polarity, is applied to the primary transfer rollers 36 by an electricity supplying unit (not shown). Due to this structure, the toner images formed on the image holding bodies 18 are transferred onto the intermediate transfer belt 34.

A removing device 46, that causes a blade to contact the intermediate transfer belt 34 and removes residual toner, paper dust, and the like that are on the intermediate transfer belt 34, is provided at the opposite side of the drive roller 38 with the intermediate transfer belt 34 sandwiched therebetween.

Two recording media accommodating sections 48, that accommodate recording media P that are examples of media such as sheets or the like, are provided along the horizontal direction beneath the transfer section 32.

The recording media accommodating sections 48 can be pulled-out freely from the first housing 10A. A feed-out roller 52, that feeds the recording medium P out from the recording media accommodating section 48 to a conveying path 60, is provided above one end side (the right side in FIG. 1) of each of the recording media accommodating sections 48.

A bottom plate 50 on which the recording media P are placed is provided within each of the recording media accommodating sections 48. When the recording media accommodating section 48 is pulled-out from the first housing 10A, the bottom plate 50 is lowered due to the instruction of an unillustrated control section. Due to the bottom plate 50 being lowered, a space into which a user replenishes the recording media P is formed in the recording media accommodating section 48.

When the recording media accommodating section 48 that has been pulled-out from the first housing 10A is set in the first housing 10A, the bottom plate 50 rises up due to the instruction of the control section. Due to the bottom plate 50 rising up, the uppermost recording medium P that is set on the bottom plate 50 and the feed-out roller 52 contact one another.

Separating rollers 56, that separate one-by-one the recording media P that are fed-out from the recording media accommodating section 48 in a state of being superposed one another, are provided at the recording medium conveying direction downstream side (hereinafter simply called "downstream side" upon occasion) of the feed-out roller 52. Plural conveying rollers 54, that convey the recording medium P to the conveying direction downstream side, are provided at the downstream side of the separating rollers 56.

The conveying path 60, that is provided between the recording media accommodating sections 48 and the transfer section 32, extends to a transfer position T between the secondary transfer roller 62 and the opposing roller 42, so as to turn the recording medium P, that is fed-out from the recording media accommodating section 48, back toward the left side in FIG. 1 at a first turn-back section 60A, and further, turn the recording medium P back toward the right side in FIG. 1 at a second turn-back section 60B.

A transfer bias voltage of the opposite polarity as the toner polarity is applied by an electricity supplying section (not shown) to the secondary transfer roller 62. Due to this structure, the toner images of the respective colors, that have been transferred onto the intermediate transfer belt 34 so as to be superposed one on another, are secondarily transferred, by the secondary transfer roller 62, onto the recording medium P that is conveyed-in along the conveying path 60.

A spare path 66 that extends from the side surface of the first housing 10A is provided so as to merge into the second turn-back section 60B of the transfer path 60. The recording medium P, that is fed-out from another recording media accommodating section (not shown) that is disposed adjacent to the first housing 10A, is fed-into the conveying path 60 through the spare path 66.

Plural conveying belts 70, that convey the recording medium P on which the toner images have been transferred toward the second housing 10B, are provided in the first housing 10A at the downstream side of the transfer position T. A conveying belt 80, that conveys downstream the recording medium P that has been conveyed by the conveying belts 70, is provided in the second housing 10B.

Each of the plural conveying belts 70 and the conveying belt 80 is formed in an annular shape and is trained around a pair of training rollers 72. The pair of training rollers 72 are disposed at the recording medium P conveying direction upstream side and downstream side, respectively. Due to one of the training rollers 72 being driven to rotate, the conveying belt 70 (the conveying belt 80) is circulated in one direction (clockwise direction in FIG. 1).

A fixing unit 82 that fixes the toner images, that have been transferred onto the surface of the recording medium P, to the recording medium P by heat and pressure is provided at the downstream side of the conveying belt 80.

The fixing unit 82 has a fixing belt 84 and a pressure-applying roller 88 that is disposed so as to contact the fixing belt 84 from the lower side thereof. A fixing portion N, at which pressure is applied to the recording medium P and the recording medium P is heated such that the toner images are fixed thereon, is formed between the fixing belt 84 and the pressure-applying roller 88.

The fixing belt 84 is formed in an annular shape, and is trained around a drive roller 89 and a driven roller 90. The drive roller 89 opposes the pressure-applying roller 88 from the upper side thereof, and the driven roller 90 is disposed further toward the upper side than the drive roller 89.

A heating portion, such as a halogen heater or the like, is incorporated in each of the drive roller 89 and the driven roller 90. The fixing belt 84 is heated thereby.

As shown in FIG. 1, a conveying belt 108, that conveys downstream the recording medium P that is fed-out from the fixing unit 82, is provided at the downstream side of the fixing unit 82. The conveying belt 108 is formed similarly to the conveying belt 70.

A cooling unit 110, that cools the recording medium P heated by the fixing unit 82, is provided at the downstream side of the conveying belt 108.

The cooling unit 110 has an absorbing device 112 that absorbs the heat of the recording medium P, and a pushing device 114 that pushes the recording medium P against the absorbing device 112. The absorbing device 112 is disposed at one side of the conveying path 60 (the upper side in FIG. 1), and the pushing device 114 is disposed at the other side (the lower side in FIG. 1).

The absorbing device 112 has an absorbing belt 116 that is annular and contacts the recording medium P and absorbs the heat of the recording medium P. The absorbing belt 116 is trained around a drive roller 120 that transmits driving force to the absorbing belt 116, and plural training rollers 118.

A heat sink 122, that is formed of an aluminum material and planarly contacts the absorbing belt 116 and dissipates the heat that the absorbing belt 116 has absorbed, is provided at the inner peripheral side of the absorbing belt 116.

Fans 128, for taking heat from the heat sink 122 and exhausting hot air to the exterior, are disposed at the rear side of the second housing 10B (the far side in the depthwise direction of FIG. 1).

The pushing device 114, that pushes the recording medium P against the absorbing device 112, has a pushing belt 130 that is annular and conveys the recording medium P while pushing the recording medium P against the absorbing belt 116. The pushing belt 130 is trained around plural training rollers 132.

A correcting device 140 that nips and conveys the recording medium P and corrects curving (curling) of the recording medium P, is provided at the downstream side of the cooling unit 110.

An inline sensor 200, that serves as an example of a sensing device that senses toner density defects, image defects and image position defects of the toner images fixed on the recording medium, and the position and the shape and the like of the recording medium P, is provided at the downstream side of the correcting device 140. Details of the inline sensor 200 are described later.

Discharging rollers 198, that discharge the recording medium P, on whose one side an image has been formed, out to a discharging section 196 that is mounted to the side surface of the second housing 10B, are provided at the downstream side of the inline sensor 200.

On the other hand, when images are to be formed on both surfaces, the recording medium P that is sent-out from the inline sensor 200 is conveyed to an inversion path 194 that is provided at the downstream side of the inline sensor 200.

Provided at the inversion path 194 are: a forked-off path 194A that is forked-off from the conveying path 60; a sheet conveying path 194B, that conveys, toward the first housing 10A side, the recording medium P that is conveyed along the forked-off path 194A; and an inverting path 194C that turns the recording medium P, that is conveyed along the sheet conveying path 194B, back in the opposite direction so as to switchback-convey the recording medium P and invert the obverse and reverse thereof.

Due to this structure, the recording medium P that is switchback-conveyed at the inverting path 194C is conveyed toward the first housing 10A, and further, is fed into the conveying path 60 provided above the recording media accommodating sections 48 and is again fed to the transfer position T.

The image forming processes of the image forming device 10 are described next.

The image data that has been subjected to image processings at the image signal processing section 13 is sent to the respective exposure devices 40. At the exposure devices 40, the respective light beams L are emitted in accordance with the image data and expose the respective image holding bodies 18 that have been charged by the scorotron chargers 20, such that electrostatic latent images are formed.

As shown in FIG. 2, the electrostatic latent images that are formed on the image holding bodies 18 are developed by the developing devices 22, and toner images of the respective colors of the first special color (V), the second special color (W), yellow (Y), magenta (M), cyan (C) and black (K) are formed.

As shown in FIG. 1, the toner images of the respective colors, that are formed on the image holding bodies 18 of the respective image forming units 16V, 16W, 16Y, 16M, 16C, 16K, are successively transferred in a superposed manner onto the intermediate transfer belt 34 by the six primary transfer rollers 36V, 36W, 36Y, 36M, 36C, 36K.

The toner images of the respective colors that have been transferred onto the intermediate transfer belt 34 so as to be superposed one on another, are secondarily-transferred, by the secondary transfer roller 62, onto the recording medium P that is conveyed-in from the recording media accommodating section 48. The recording medium P, on which the toner images have been transferred, is conveyed by the conveying belts 70 toward the fixing unit 82 that is provided within the second housing 10B.

The toner images of the respective colors on the recording medium P are fixed to the recording medium P by heat and pressure being applied thereto by the fixing unit 82. Further, the recording medium P on which the toner images have been fixed passes through the cooling unit 110 and is cooled, and thereafter, is sent into the correcting device 140 such that curvature that has arisen at the recording medium P is corrected.

Image defects and the like of the recording medium P, whose curving has been corrected, are detected by the inline sensor 200. Thereafter, the recording medium P is discharged-out to the discharging section 196 by the discharging rollers 198.

On the other hand, if an image is to be formed on the non-image surface at which an image has not been formed (i.e., if double-sided printing is to be carried out), after passing through the inline sensor 200, the recording medium P is inverted at the inversion path 194, and is fed-into the conveying path 60 provided above the recording media accommodating sections 48. Toner images are formed on the reverse surface of the recording medium P by the processes described above.

Note that, in the image forming device 10 relating to the present exemplary embodiment, the parts for forming the images of the first special color and the second special color (the image forming units 16V, 16W, the exposure devices 40V, 40W, the toner cartridges 14V, 14W, the primary transfer rollers 36V, 36W) are structured so as to be able to be installed in the first housing 10A as additional parts in accordance with the selection of the user. Accordingly, the image forming device 10 may be structured so as to not have parts for forming images of a first special color and a second special color, or may be structured so as to have only parts for forming the image of either one color among a first special color and a second special color.

The inline sensor 200 is described next.

In the following description, the length direction of the image forming device 10 (the subscanning direction that is the conveying direction of the recording medium P) is called the X direction, the height direction of the device is called the Y direction, and the depth direction of the device (the main scanning direction) is called the Z direction. The X direction, the Y direction and the Z direction are perpendicular to one another. Further, in the following description, "front surface" refers to the surface of the device that is shown in FIG. 1, and "rear surface" refers to the surface of the device at the side opposite the front surface.

(Basic Structure and Functions of Inline Sensor)

Figure 3:
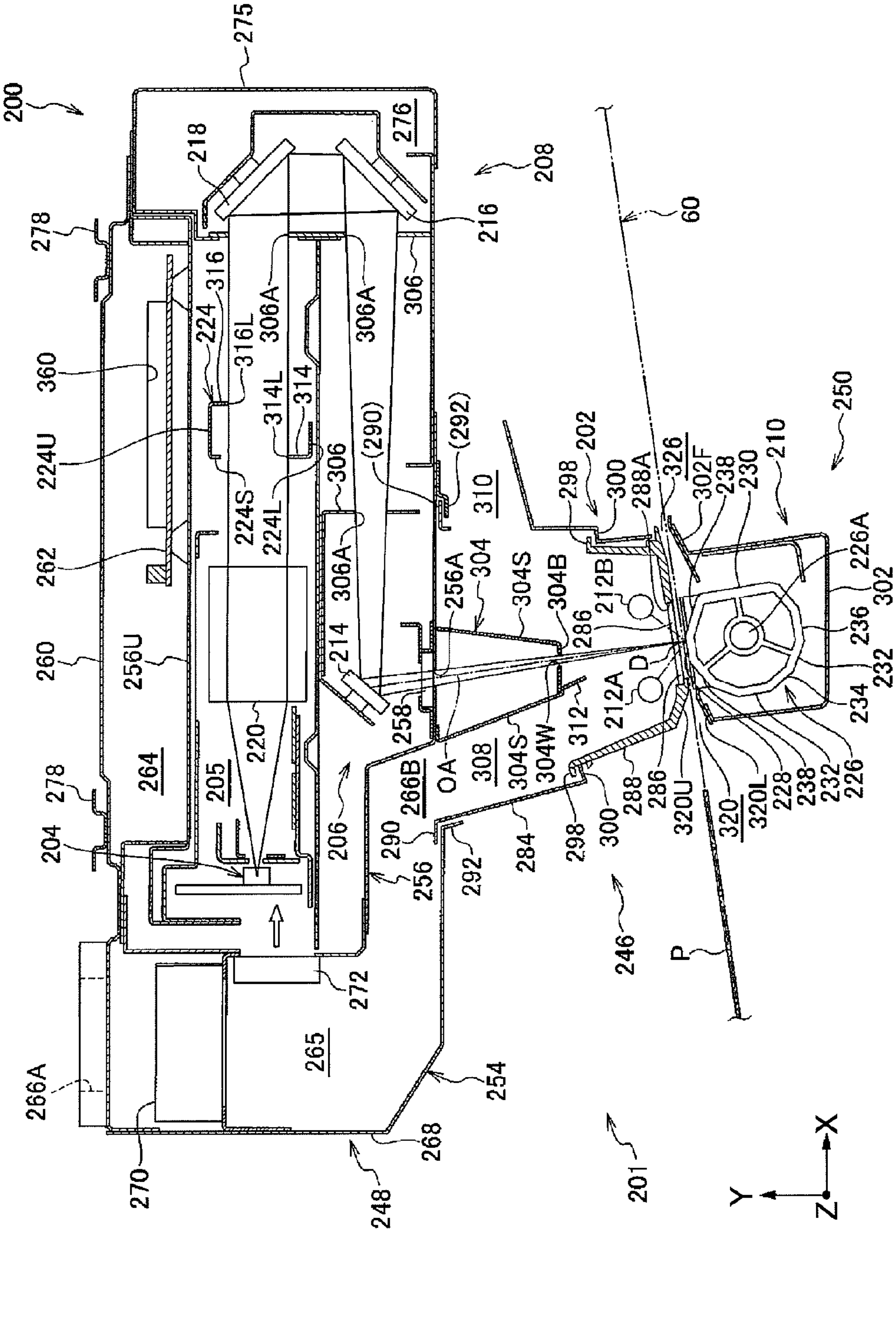
FIG. 3 is a sectional view showing an inline sensor relating to the exemplary embodiment of the present invention.

As shown in FIG. 3, the inline sensor 200 has: an illuminating section 202 that illuminates light toward the recording medium P on which an image has been recorded; an imaging section 208 having an imaging optical system 206 that images light, that has been illuminated from the illuminating section 202 and reflected at the recording medium P, onto a CCD sensor 204 that serves as an example of a light-receiving portion; and a setting section 210 at which various types of references and the like at the time of using and at the time of calibrating the inline sensor 200 are set. The CCD sensor 204 is structured so as to receive light reflected at the recording medium P, and sense the image on the basis of the intensity of the light.

Note that the light from the recording medium P includes reflected light that was reflected at the recording medium P and transmitted light that was transmitted through the recording medium P. In a broader sense, the light from the recording medium P is light that makes it possible to sense information relating to the image formed on the recording medium P and the position and shape of the recording medium P. Further, transmission includes, in addition to light passing through a window glass or the like, light passing through an imaging lens or the like as well. Moreover, sensing of the recording medium P includes sensing of the position and shape of the recording medium P.

The illuminating section 202 is disposed at the upper side of the conveying path 60 of the recording medium P, and has a pair of lamps 212. The lamps 212 are xenon lamps whose lengths are in the Z direction, and the lengths of the ranges of illumination thereof are greater than the width of the largest recording medium P that is conveyed. The pair of lamps 212 are disposed symmetrically around an optical axis OA (the optical axis from the standpoint of design) that is reflected by the recording medium P and heads toward the imaging section 208. More specifically, the lamps 212 are disposed so as to be symmetrical to one another with respect to the optical axis OA and such that the angles of illumination onto the recording medium P are respectively 45° to 50°.

In detail, the pair of lamps 212 includes a first lamp 212A that is provided at the upstream side in the conveying direction of the recording medium P, and a second lamp 212B that is provided at the side opposite the first lamp 212A with the optical axis OA therebetween.

The imaging optical system 206 is structured with the main portions thereof being: a first mirror 214 that reflects, in the X direction (in the present exemplary embodiment, toward the downstream side in the conveying direction of the recording medium P), the light that is led along the optical axis OA; a second mirror 216 that reflects upward the light reflected by the first mirror 214; a third mirror 218 that reflects, toward the upstream side in the conveying direction of the recording medium P, the light reflected by the second mirror 216; and a lens 220 that collects (images), onto the CCD sensor 204, the light reflected by the third mirror 218. The CCD sensor 204 is disposed at the upstream side, in the conveying direction of the recording medium P, with respect to the optical axis OA.

The length in the Z direction of the first mirror 214 is greater than the width of the largest recording medium P. The first mirror 214, the second mirror 216 and the third mirror 218 reflect the reflected light of the recording medium P that is incident on the imaging optical system 206, while respectively narrowing the light in the Z direction (the main scanning direction). Due thereto, reflected light from respective portions in the transverse direction of the recording medium P are made incident on the lens 220 that is substantially cylindrical.

Due to the above structure, at the inline sensor 200, the CCD sensor 204 outputs (feeds-back) signals, that correspond to the imaged light, i.e., the image density, to a control device 192 (see FIG. 1) of the image forming device 10. On the basis of the signals from the inline sensor 200, the control device 192 corrects the images formed at the image forming units 16. At the image forming device 10, as an example, the intensities of the lights illuminated by the exposure devices 40, the formed positions of the images, and the like are corrected on the basis of the signals from the inline sensor 200.

Further, a light amount narrowing portion 224 is provided between the third mirror 218 and the lens 220 at the imaging optical system 206. The light amount narrowing portion 224 narrows, in the Y direction (a direction intersecting the main scanning direction), the light amount of the light that traverses the optical path in the Z direction and is imaged on the CCD sensor 204, and is structured so as to be able to adjust the amount of narrowing of the light amount by being operated from the exterior. The amount of narrowing of the light amount by the light amount narrowing portion 224 is adjusted such that, even if the amount of light emitted from each of the lamps 212 varies over time, the light amount that is imaged on the CCD sensor 204 is a predetermined amount. Details are described later.

On the other hand, the setting section 210 has a reference roller 226 that is long in the Z direction. The reference roller 226 has: a detection reference surface 228 that is directed toward the conveying path 60 side at the time of carrying out image detection of the recording medium P; a withdrawn surface 230 that is directed toward the conveying path side when image detection of the recording medium P by the inline sensor 200 is not carried out; white reference surfaces 232; a color reference surface 234 at which patterns of multiple colors are formed along the longitudinal direction; and a combined test surface 236 at which plural patterns for testing are formed. In the present exemplary embodiment, the reference roller 226 is formed in the shape of a polygonal tube at which eight or more surfaces are formed in the peripheral direction. One of each of the detection reference surface 228, the withdrawn surface 230, the color reference surface 234, and the combined test surface 236 are provided, and two of the white reference surfaces 232 are provided.

The reference roller 226 is structured such that the surface thereof that is directed toward the conveying path 60 is switched due to the reference roller 226 rotating around a rotating shaft 226A. The switching of the surface of the reference roller 226 is carried out by a control circuit that is provided at a circuit board 262 that is described later. Further, by forming the reference roller 226 in the shape of a polygonal tube more than an octagonal shape, the difference in the distances, with respect to the center of rotation, of the peripheral direction centers of the respective surfaces and the corner portions between the surfaces is kept small. Due thereto, the corner portions between the surfaces of the reference roller 226 do not interfere with the illuminating section 202, while the distances between the respective surfaces of the reference roller 226 and the illumination positions of the respective lamps 212 (the window glass 286 that is described later) are kept small.

The width in the peripheral direction of the detection reference surface 228 is smaller than those of the other surfaces. The surfaces at the both peripheral direction sides of the detection reference surface 228 are guide surfaces 238 that do not function as the above-described references. The detection reference surface 228 is a setting surface (position reference surface) that sets the position of the surface (reflection surface) to be detected (to be read) of the recording medium P that is conveyed.

The width in the peripheral direction of the withdrawn surface 230 is larger than those of the other surfaces. The withdrawn surface 230 is a guide surface that guides the recording medium P when image detection of the recording medium P by the inline sensor 200 is not carried out. The distance to the withdrawn surface 230 from the axial center of the rotating shaft 226A is smaller than that of the detection reference surface 228. Due thereto, when image detection of the recording medium P by the inline sensor 200 is not carried out, a conveying path is formed at which the interval between the withdrawn surface 230 and the illuminating section 202 (the window glass 286) is wider than when image detection of the recording medium P by the inline sensor 200 is carried out.

The white reference surface 232 is for calibration of the imaging optical system 206, and is structured by adhering a reference white film such that a predetermined signal is outputted from the imaging optical system 206. The color reference surface 234 is for calibration of the imaging optical system 206, and is structured by adhering a film at which are formed patterns of reference colors such that predetermined signals are outputted from the imaging optical system 206 in accordance with the respective colors.

Figure 4:
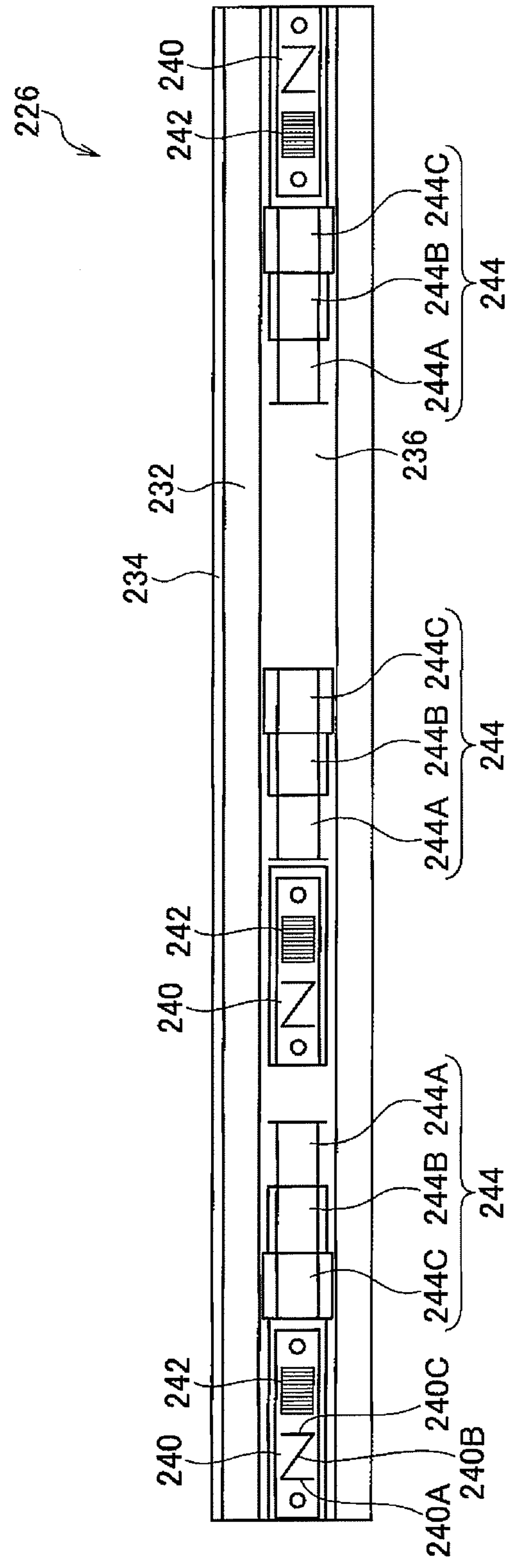
FIG. 4 is a plan view showing a combined test surface of a reference roller provided at the inline sensor relating to the exemplary embodiment of the present invention.

As shown in FIG. 4, at the combined test surface 236, a position detection pattern 240 for calibrating the position in the rotating direction of the reference roller 226 (the conveying direction of the recording medium P), a focus detection pattern 242, and a depth detection pattern 244 are formed so as to be disposed on the same surface.

The position detection pattern 240 is structured by adhering a film having a white background on which a pattern, that is the letter "N" in black, is formed such that the vertical lines of the letter "N" run along the conveying direction of the recording medium P. The focus detection pattern 242 is structured by adhering a film having a white background on which is formed a ladder pattern that is as if numerous black straight lines are lined-up along the transverse direction of the recording medium P.

The depth detection pattern 244 is formed by a film having a white background being adhered to steps at which three depth detection portions 244A, 244B, 244C, whose distances from the rotating shaft 226A of the reference roller 226 are different from one another, are arrayed in the form of steps in the longitudinal direction of the combined test surface 236.

At least one of the position detection patterns 240 is provided at each of the longitudinal direction both ends of the combined test surface 236. The focus detection patterns 242 are disposed so as to be adjacent to the position at the longitudinal direction central sides of the combined test surface 236 with respect to the position detection patterns 240 disposed at the aforementioned both ends. A total of three of the depth detection patterns 244 are provided, at both end sides and at the central portion in the longitudinal direction of the combined test surface 236. In the present exemplary embodiment, a further one of each of the position detection pattern 240 and the focus detection pattern 242 are provided between the depth detection pattern 244 disposed in the center and the depth detection pattern 244 disposed at one longitudinal direction end.

The processes of calibration of the CCD sensor 204 are described next.

As shown in FIG. 3, first, the white reference surface 232 is directed toward the conveying path 60 of the recording medium P. The CCD sensor 204 outputs a shading correction signal that corrects the light amount distribution in the Z direction (the main scanning direction). Next, the combined test surface 236 is directed toward the conveying path 60 of the recording medium P, and the detection position by the CCD sensor 204 in the conveying direction of the recording medium P is automatically adjusted due to the position detecting pattern 240. Namely, by carrying out detection by traversing the pattern of the letter "N" in the Z direction (the main scanning direction), as shown in FIG. 4, two straight line portions 240A, 240C, and an inclined portion 240B therebetween, are detected. Then, the reference roller 226 is rotated such that the interval between the straight line portion 240A and the inclined portion 240B, and the interval between the straight line portion 240C and the inclined portion 240B, become equal, and the detection position is adjusted.

After the detection position in the conveying direction of the recording medium P is adjusted, the focal point of the CCD sensor 204 is confirmed by the focus detection pattern 242, and the illumination depth is confirmed by the depth detection pattern 244.

Further, the color reference surface 234 is directed toward the conveying path 60 of the recording medium P. The CCD sensor 204 is automatically adjusted such that a signal of a predetermined intensity is outputted at each color.

Note that the calibration of the CCD sensor 204 as described above is carried out, for example, when the power of the image forming device 10 is turned on (around one time per day). On the other hand, the calibration of the image forming device 10 based on the signals of the CCD sensor 204 (the above-described adjustment of the exposure devices 40 and the like) is carried out, for example, each time a job that forms images on a predetermined amount or more of the recording media P is completed (around 10 times per day).

(Divided Structure of Inline Sensor)

Figure 5:
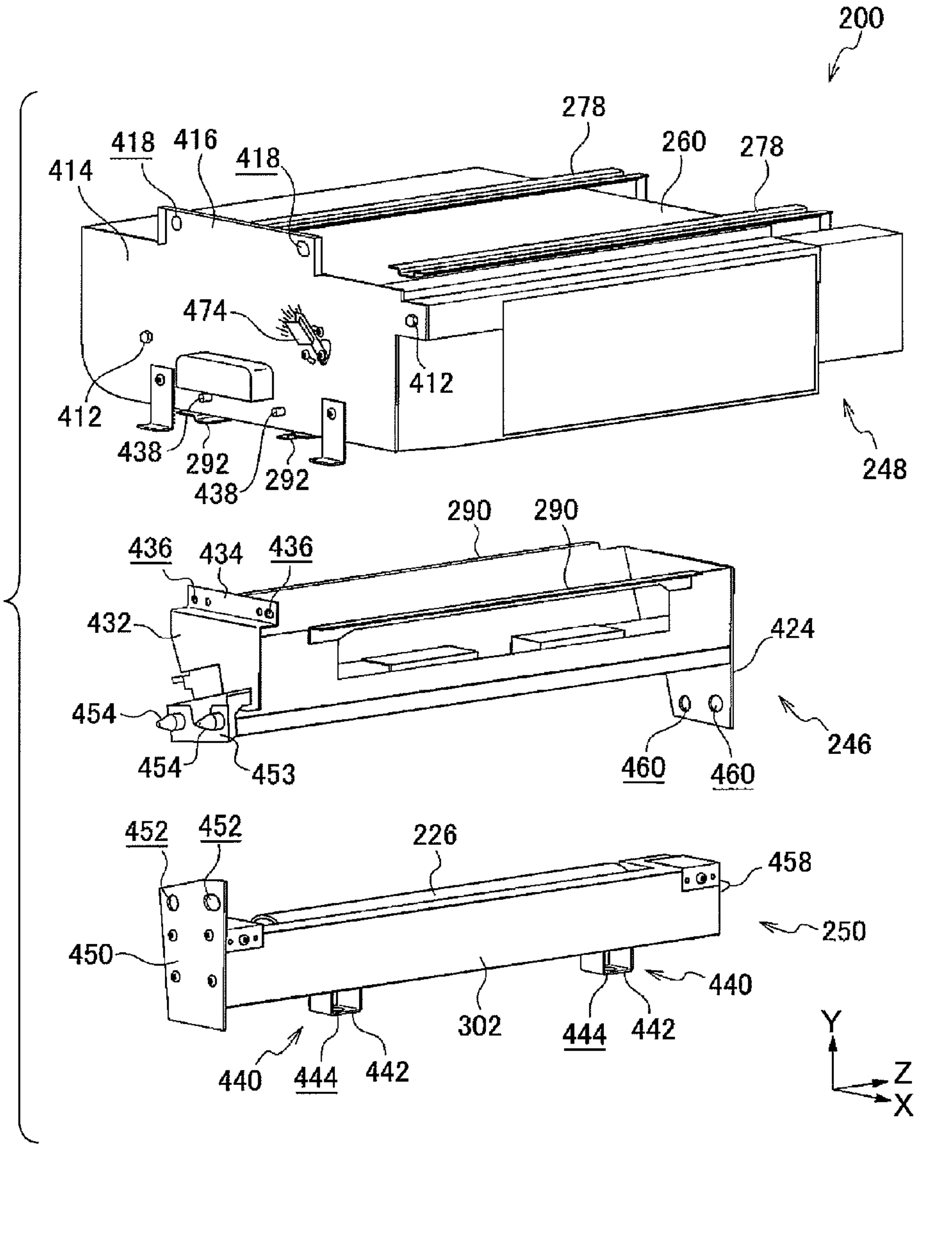
FIG. 5 is a perspective view showing the inline sensor relating to the exemplary embodiment of the present invention separated into respective units.
Figure 6:
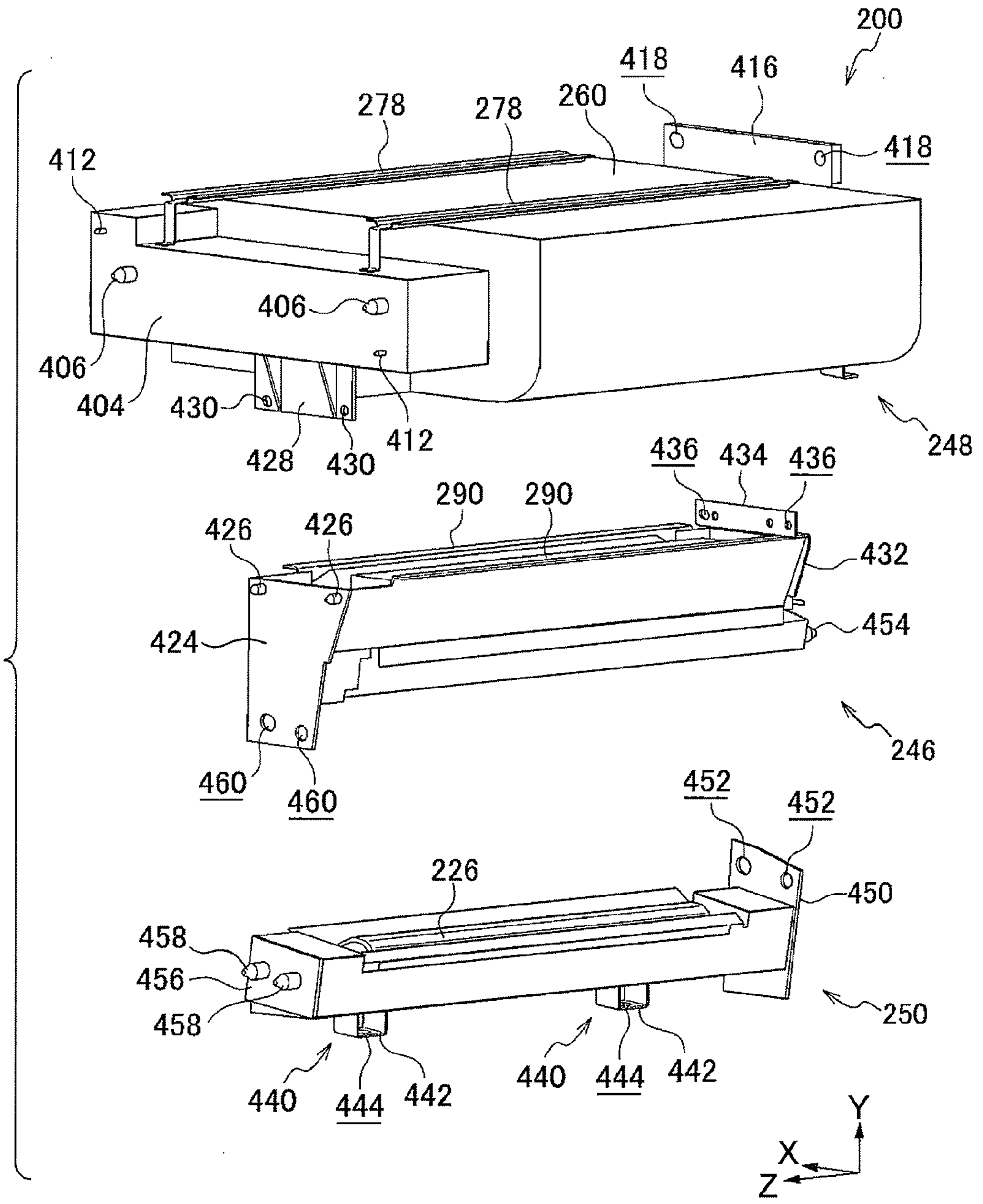
FIG. 6 is a perspective view showing the inline sensor relating to the exemplary embodiment of the present invention separated into the respective units.

As shown in FIG. 3, FIG. 5 and FIG. 6, the above-described inline sensor 200 is structured so as to be able to be divided into three units including a center unit 246 whose main portion is the illuminating section 202, an upper unit 248 whose main portion is the imaging section 208, and a lower unit 250 whose main portion is the setting section 210. In FIG. 5, the upper unit 248, the center unit 246, and the lower unit 250 are respectively illustrated from the front side. In FIG. 6, these units are shown from the rear side.

Figure 7:
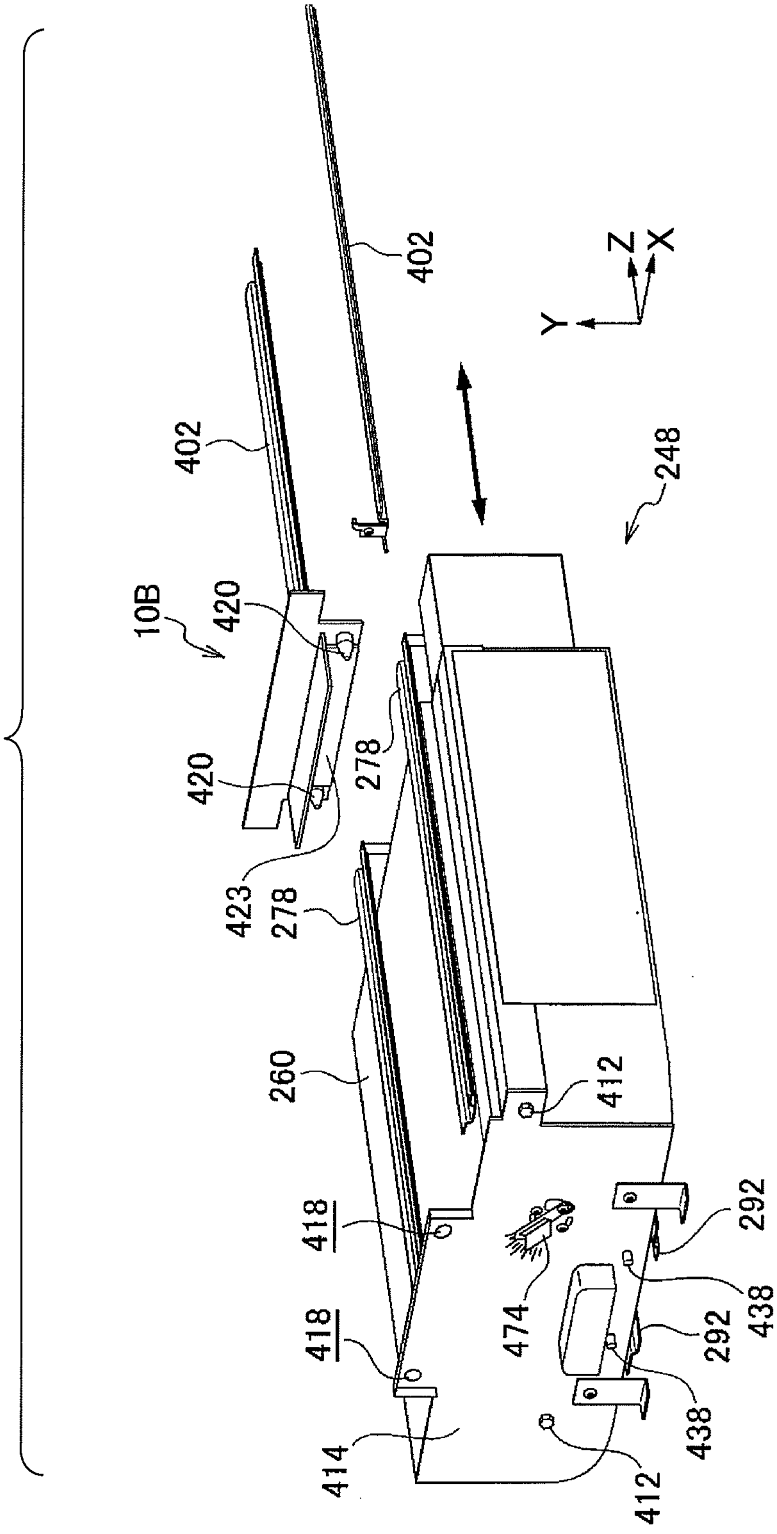
FIG. 7 is a perspective view showing installation and removal of an upper unit of the inline sensor relating to the exemplary embodiment of the present invention.
Figure 8:
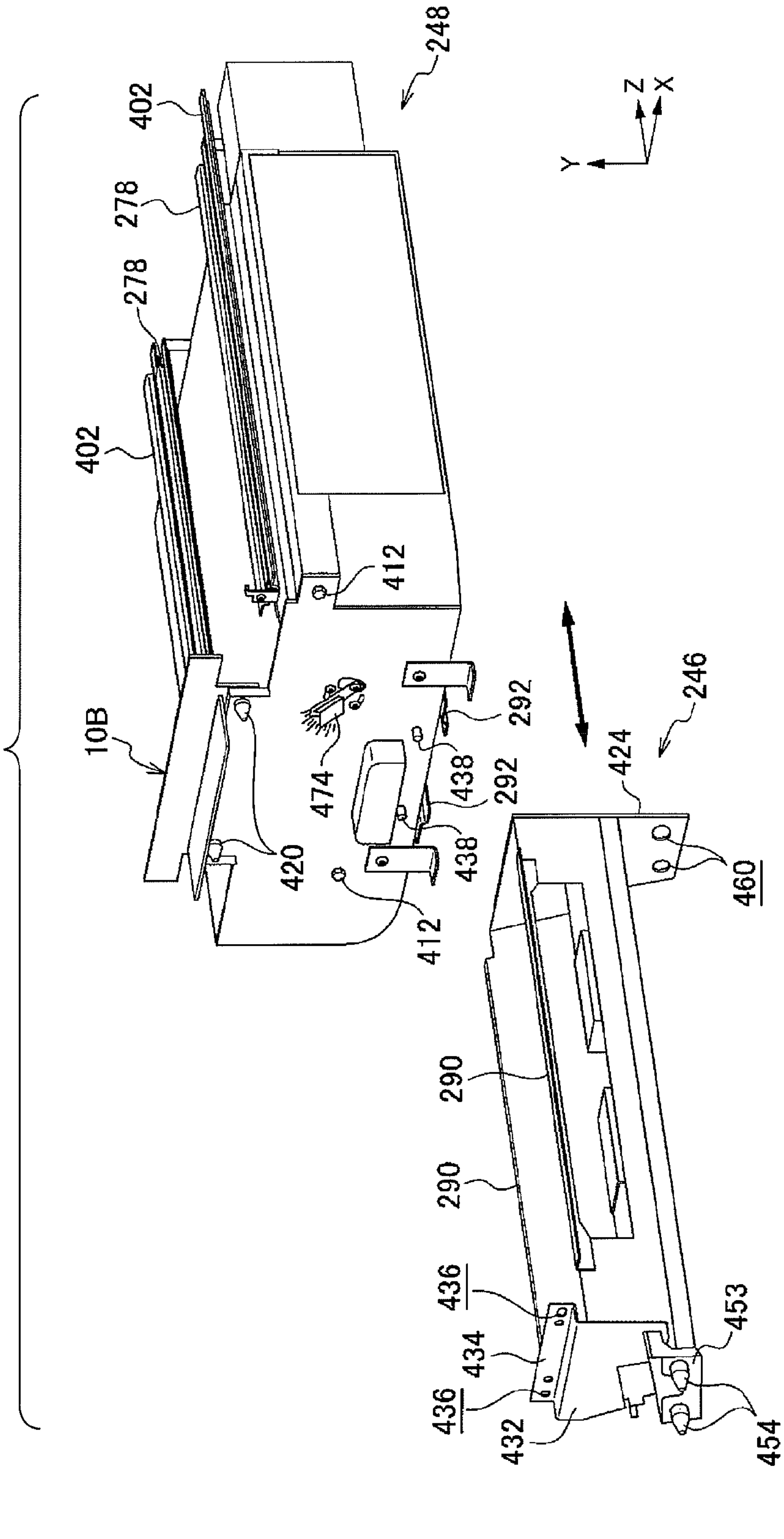
FIG. 8 is a perspective view showing installation and removal of a center unit of the inline sensor relating to the exemplary embodiment of the present invention.
Figure 9:
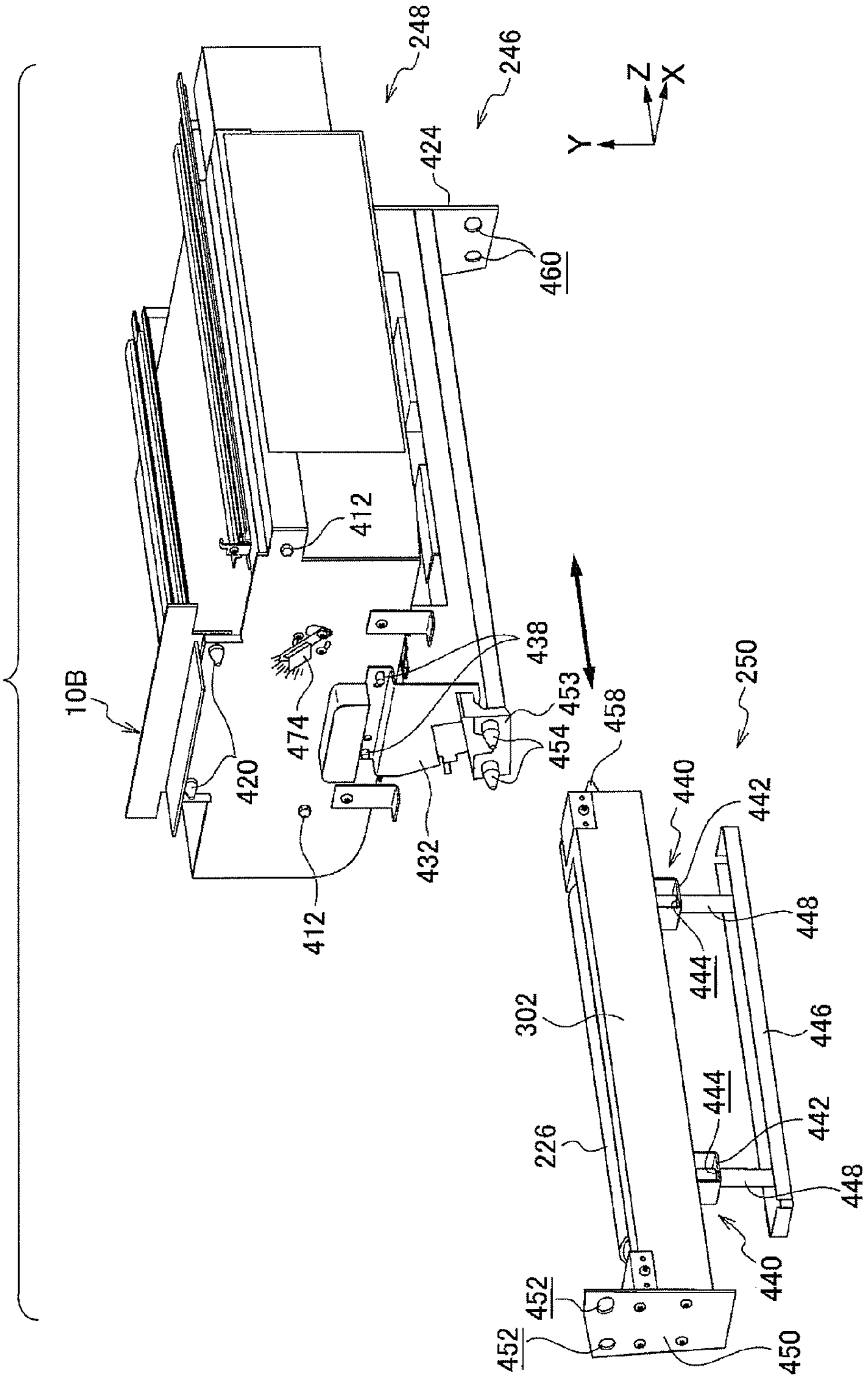
FIG. 9 is a perspective view showing installation and removal of a lower unit of the inline sensor relating to the exemplary embodiment of the present invention.
Figure 10:
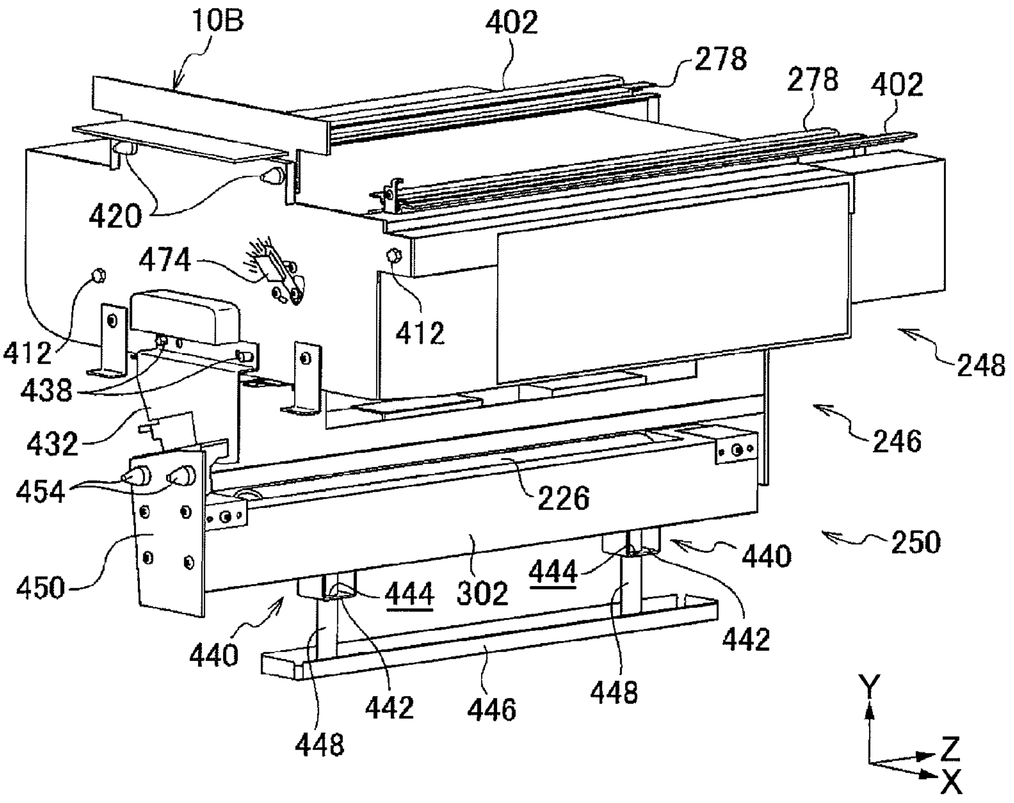
FIG. 10 is a perspective view showing a state in which the respective units of the inline sensor relating to the exemplary embodiment of the present invention are installed.
Figure 11:
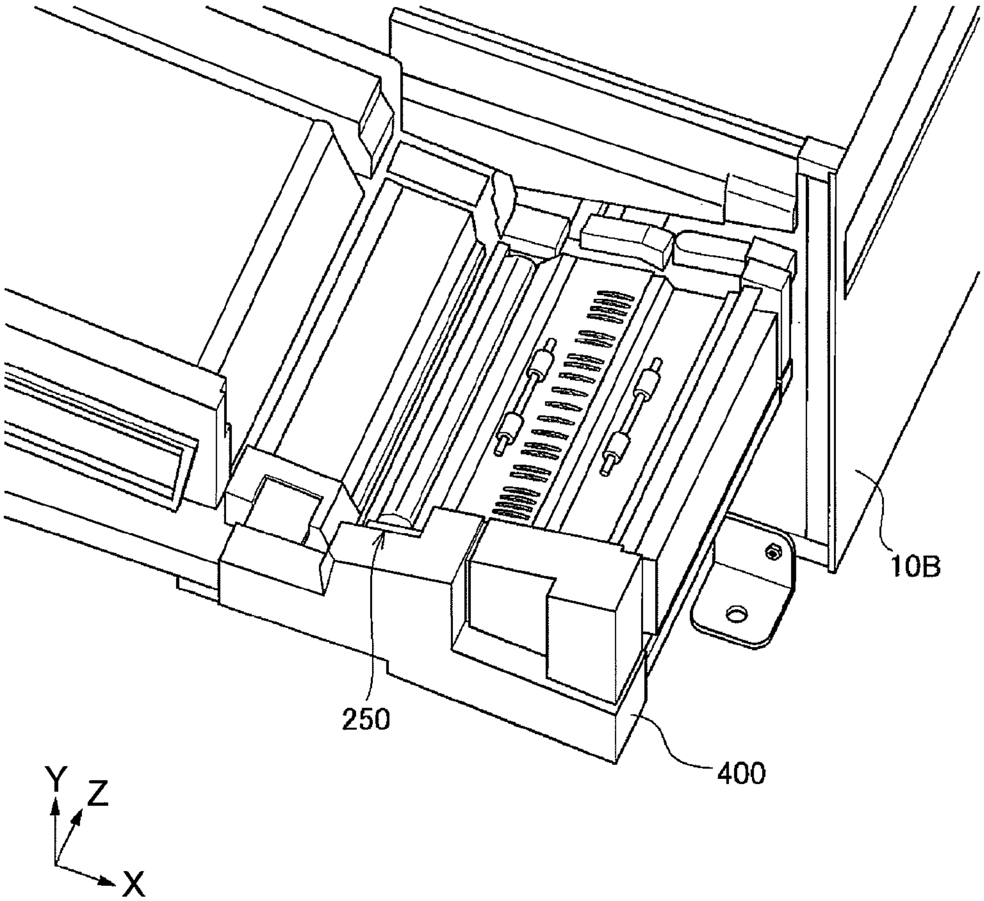
FIG. 11 is a perspective view showing a state in which a lower drawer of the image forming device relating to the exemplary embodiment of the present invention is pulled-out.

As shown in FIG. 7 and FIG. 8, the upper unit 248 can be installed in and removed from the second housing 10B (see FIG. 1) of the image forming device 10 by being slid in the Z direction. As shown in FIG. 8 and FIG. 9, the center unit 246 can be installed in and removed from the upper unit 248 by being slid in the Z direction. As shown in FIG. 9 and FIG. 10, the lower unit 250 can be installed in and removed from the center unit 246 by being slid in the Z direction. Note that, as shown in FIG. 11, the lower unit 250 disposed at the lower side of the conveying path 60 of the recording medium P, is supported by a lower drawer 400 that is pulled-out from the second housing 10B in order to clear-up jamming of the recording medium P, and the lower unit 250 is installed in and removed from the center unit 246 accompanying the pushing-in and pulling-out of this lower drawer 400. Details are described later.

As shown in FIG. 3 and FIG. 7, sliders 278 that are long in the Z direction are provided at an upper cover 260 of the upper unit 248. In the present exemplary embodiment, the pair of sliders 278 are provided at the upper cover 260 so as to be parallel in the X direction. Each of the sliders 278 is fit-together with a rail 402 provided at the second housing 10B. The sliders 278 move while being guided by the rails 402, and the upper unit 248 is moved in the Z direction with respect to the second housing 10B.

Figure 12:
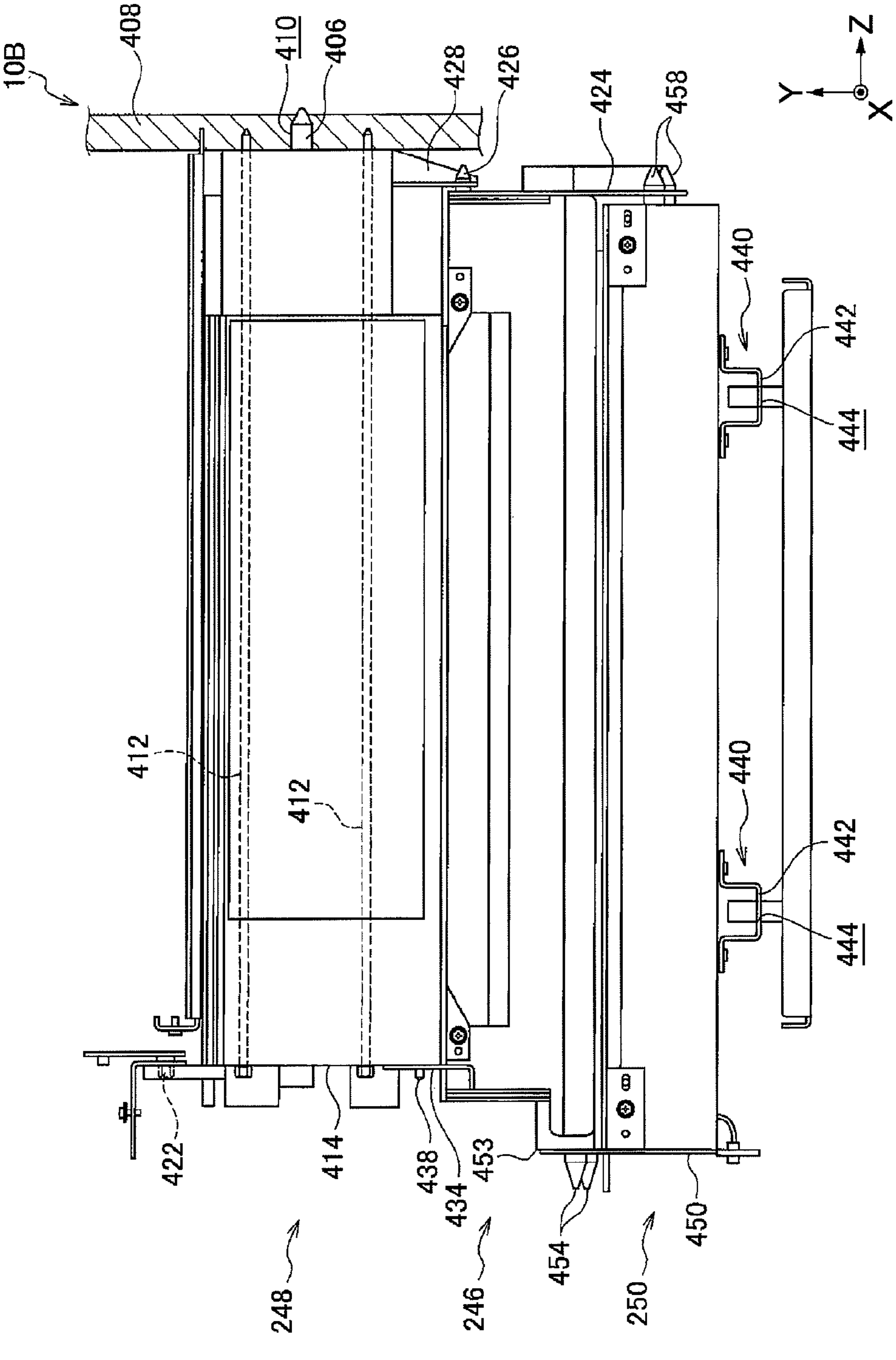
FIG. 12 is a side view showing a state in which the respective units of the inline sensor relating to the exemplary embodiment of the present invention are installed.

As shown in FIG. 6, two positioning pins 406 that project toward the outer side are provided at a rear cover 404 of the upper unit 248. On the other hand, two positioning holes 410 (only one is shown in FIG. 12) that correspond to the positioning pins 406 are provided in a receiving frame 408 (shown in FIG. 12) of the second housing 10B. One of the two positioning holes 410 is a long hole that is long in the X direction. When the upper unit 248 is to be installed in the second housing 10B, the positioning pins 406 are inserted into the positioning holes 410, and the position of the upper unit 248 in the X direction and the Y direction with respect to the second housing 10B is determined at the rear side. Further, the position in the Z direction is determined by the rear cover 404 being pushed against the receiving frame 408.

In order to fix the upper unit 248 to the second housing 10B such that the rear cover 404 is pushed against the receiving frame 408, the upper unit 248 and the receiving frame 408 are fastened together by using elongated screws 412 that are inserted and pass through the upper unit 248 from the front side toward the rear side. By using the elongated screws 412, fastening by screws can be carried out with good workability from the front side.

As shown in FIG. 5, a projecting portion 416 that projects upward in the Y direction is provided at a front cover 414 of the upper unit 248. Two positioning holes 418 are provided in the projecting portion 416. One of the two positioning holes 418 is a long hole that is long in the X direction. On the other hand, positioning pins 420 (shown in FIG. 7) that correspond to these positioning holes 418 are provided at the second housing 10B. When the upper unit 248 is to be installed in the second housing 10B, the positioning pins 420 are fit-in the positioning holes 418, and the position of the upper unit 248 in the X direction and the Y direction with respect to the second housing 10B is determined at the front side. Note that, after installation, the projecting portion 416 and the second housing 10B are fastened and fixed together at the front side by screws 422 (shown in FIG. 12). Here, the position of a frame 423 (shown in FIG. 7), that is fastened and fixed to the projecting portion 416 by the screws 422, can be adjusted in the Z direction (not illustrated). After the upper unit 248 is positioned in the Z direction at the rear side, the frame 423 and the projecting portion 416 are fastened and fixed together by the screws 422 while the position of the frame 423 in the Z direction is adjusted at the front side.

As shown in FIG. 3 and FIG. 8, the center unit 246 has a pair of sliders 290 that are long in the Z direction and that project-out in flange shapes in the X direction from edges of the opening at the upper side. Each of the sliders 290 is fit-together with a rail 292 that is formed at the bottom surface of the upper unit 248. The sliders 290 move while being guided by the rails 292, and the center unit 246 is moved in the Z direction with respect to the upper unit 248.

As shown in FIG. 6, two positioning pins 426 that project toward the outer side are provided at the upper end side of a rear cover 424 of the center unit 246. On the other hand, a projecting plate 428 that projects downward in the Y direction is provided at the rear cover 404 of the upper unit 248. Two positioning holes 430 that correspond to the positioning pins 426 are provided in the projecting plate 428. One of the two positioning holes 430 is a long hole that is long in the X direction. When the center unit 246 is to be installed at the upper unit 248, the positioning pins 426 are inserted in the positioning holes 430, and the position of the center unit 246 in the X direction and the Y direction with respect to the upper unit 248 is determined at the rear side.

As shown in FIG. 5, a projecting portion 434 that projects upward in the Y direction is provided at a front cover 432 of the center unit 246. Two positioning holes 436 are provided in the projecting portion 434. One of the two positioning holes 436 is a long hole that is long in the X direction. On the other hand, two positioning pins 438 that correspond to these positioning holes 436 are provided at the lower end side of the front cover 414 of the upper unit 248. When the center unit 246 is to be installed at the upper unit 248, the positioning pins 438 are fit-in the positioning holes 436, and the position of the center unit 246 in the X direction and the Y direction with respect to the upper unit 248 is determined at the front side. Further, the position in the Z direction is determined by pushing the projecting portion 434 against the front cover 414. Note that the projecting portion 434 is pushed against the front cover 414 due to the projecting portion 434 and the front cover 414 being fastened and fixed together by screws.

As shown in FIG. 3, FIG. 5, FIG. 9 and the like, the lower unit 250 has a lower housing 302 that accommodates the reference roller 226 and a motor (not shown) that drives the reference roller 226. Two leg portions 440, which form substantial "U" shapes as seen from the X direction, are provided at the bottom surface of the lower housing 302. A positioning hole 444 is provided in a bottom plate 442 of each of the leg portions 440. Two positioning pins 448, that stand in the Y direction from a bottom surface member 446 of the lower drawer 400, are fit-into these positioning holes 444, and the distal ends of the positioning pins 448 abut the bottom surface of the lower housing 302. The lower unit 250 is thereby supported by the lower drawer 400. The two positioning holes 444 are long holes that are long in the X direction. By fitting the positioning pins 448 into the positioning holes 444, the position of the lower unit 250 in only the Z direction with respect to the lower drawer 400 is determined.

As shown in FIG. 5, a front cover 450, which serves as an example of a positioned portion of the lower unit 250, projects-out upwardly and downwardly in the Y direction. Two positioning holes 452 are provided in the upper side of the front cover 450. One of the two positioning holes 452 is a long hole that is long in the X direction. On the other hand, positioning pins 454, that serve as an example of a positioning portion and that correspond to these positioning holes 452, are provided at a projecting surface 453 that projects in the Z direction at the lower end side of the front cover 432 of the center unit 246.

As shown in FIG. 6, two positioning pins 458 that project toward the outer side are provided at a rear cover 456 of the lower unit 250. On the other hand, the rear cover 424 of the center unit 246 projects downward in the Y direction. Two positioning holes 460 that correspond to the positioning pins 458 are formed at a projected position of the rear cover 424. One of the two positioning holes 460 is a long hole that is long in the X direction.

When the lower drawer 400 is pushed into the second housing 10B and the lower unit 250 is installed at the center unit 246 as shown in FIG. 9 and FIG. 10, at the front side, the positioning pins 454 of the center unit 246 are fit into the positioning holes 452 of the lower unit 250, and, at the rear side, the positioning pins 458 of the lower unit 250 are fit into the positioning holes 460 of the center unit 246. Due thereto, the position of the lower unit 250 in the X direction and the Y direction with respect to the center unit 246 is determined at the front side and the rear side. The position of the lower unit 250 with respect to the center unit 246 in the Z direction is prescribed by the position at which the lower drawer is pushed into the second housing 10B. Note that, because the position of the lower unit 250 in the Y direction is determined by the positioning pins 454, 458 and the positioning holes 452, 460, as shown in FIG. 12, the lower unit 250 is in a state of floating up from the positioning pins 448, i.e., is in a state of hanging down at the center unit 246.

As shown in FIG. 5 and FIG. 12, the joined plane of positioning of the upper unit 248 and the center unit 246 (the plane in which the front cover 414 and the projecting portion 434 are joined) is disposed so as to be further in the direction of pulling-out the lower drawer 400 than the joined plane of positioning of the center unit 246 and the lower unit 250 (the plane in which the projecting surface 453 and the front cover 450 are joined).

As described above, due to the inline sensor 200 being structured so as to be divisible to the center unit 246, the upper unit 248 and the lower unit 250, repair and replacement at times of trouble or the like can be carried out on a unit-by-unit basis. Further, in particular, by separating the center unit 246 and the lower unit 250, jamming of the recording medium P can be cleared up easily at the time when it occurs.

(Structure of Upper Unit) As shown in FIG. 3, the upper unit 248 has an upper housing 254. The upper housing 254 accommodates the imaging section 208 and the circuit board 262 that is described later, and structures a duct 265 for cooling and the like. The upper housing 254 is structured to have an imaging system housing 256 that accommodates the CCD sensor 204 and the imaging optical system 206.

The imaging system housing 256 is formed in the shape of a substantially rectangular box that is long in the X direction, as seen from the Z direction. The CCD sensor 204 is accommodated in one end portion in the X direction of the imaging system housing 256 (in the present exemplary embodiment, the end portion at the upstream side in the conveying direction of the recording medium P). Further, the second mirror 216 and the third mirror 218 are disposed at the other end portion in the X direction of the imaging system housing 256. A window portion 256A, on which light is incident along the optical axis OA, is formed in the substantially central portion in the X direction of the imaging system housing 256. An optical chamber 205 is provided in the imaging system housing 256. Due to the window portion 256A being closed by a light-transmissive window glass 258, the interior of the optical chamber 205 becomes a sealed (airtight) space, and the CCD sensor 204 and the like are accommodated therein.

The upper housing 254 has the upper cover 260 that covers the imaging system housing 256 from above. Due thereto, a substrate chamber 264 in which the circuit board 262 is accommodated, is formed between the upper cover 260 and an upper wall 256U of the imaging system housing 256. Further, the upper housing 254 has, at the outer side of the one end portion in the X direction that is the side at which the CCD sensor 204 is disposed at the imaging system housing 256, a duct cover 268 that forms the duct 265. The duct cover 268 covers the aforementioned end portion of the imaging system housing 256 from the upstream side in the conveying direction of the recording medium P and from the sheet conveying path 60 side, and forms the duct 265 whose X-Y sectional configuration is "L" shaped.

The upper end of the duct 265 is an air intake port 266A. The end portion of the duct 265 at the side opposite the air intake port 266A is a connection port 266B that is connected to a duct 308 of a lamp housing 284 that is described later. A fan 270, that creates within the duct 265 an airstream that is directed from the upper side toward the lower side, is disposed in the duct 265. Further, a fan 272, that sends air into the optical chamber 205 provided in the imaging system housing 256 (i.e., that makes the interior of the optical chamber 205 be positive pressure), is disposed in the duct 265. Moreover, a fan 274 (not illustrated), that sends air into the substrate chamber 264, is provided in the duct 265.

The upper housing 254 has a cover 275 that covers the imaging system housing 256 from the side of the second mirror 216 and the third mirror 218. The cover 275 forms a heat insulated space 276 between the cover 275 and the imaging system housing 256.

(Structure of Center Unit)

As shown in FIG. 3, the center unit 246 has the lamp housing 284 that serves as an example of a housing that accommodates the pair of lamps 212, and a window cover 288 that serves as an example of a covering member that holds the window glass 286 that serves as an example of a transmitting member through which the lights of the lamps 212 are transmitted and exit toward the recording medium P. Concretely, the lamp housing 284 is formed in the shape of a box that is open upward and downward, and the open end at the upper side is closed by the upper housing 254, and the open end at the lower side is closed by the window cover 288.

At the illuminating section 202, the lights emitted by the respective lamps 212 pass through the window glass 286 and are illuminated onto the recording medium P, and the light reflected at the recording medium P passes through the window glass 286 and enters into the lamp housing 284 along the optical axis OA. The light reflected from the recording medium P that enters into the lamp housing 284 passes through the window glass 258 of the imaging system housing 256 that structures the imaging section 208, and is guided to the imaging section 208 interior.

Figure 13A:
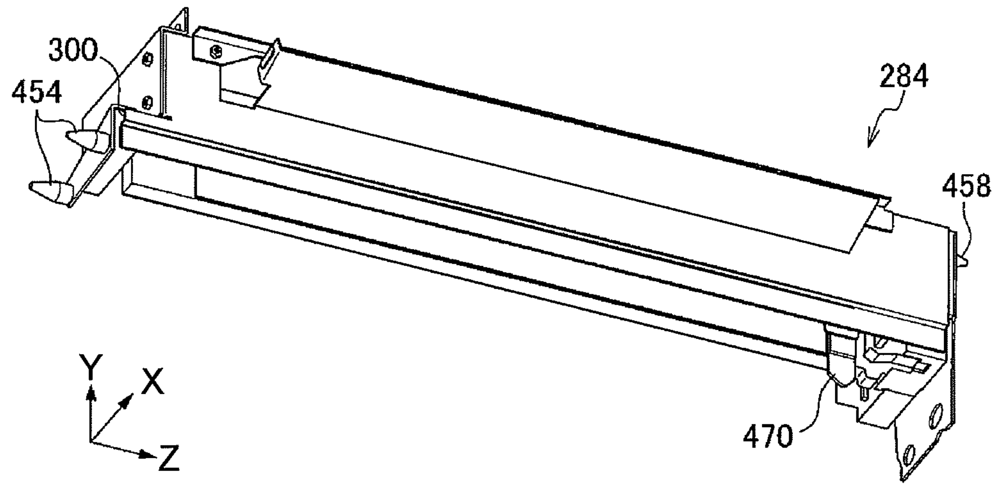
FIG. 13A is a perspective view showing a lamp housing of the inline sensor relating to the exemplary embodiment of the present invention.
Figure 13B:
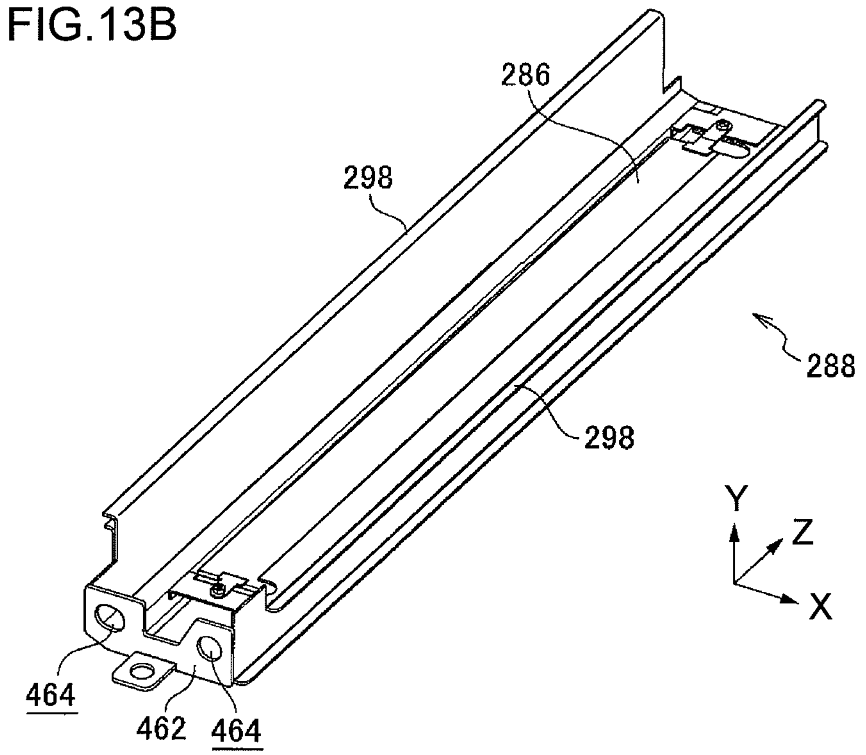
FIG. 13B is a perspective view showing a window cover of the inline sensor relating to the exemplary embodiment of the present invention.
Figure 14:
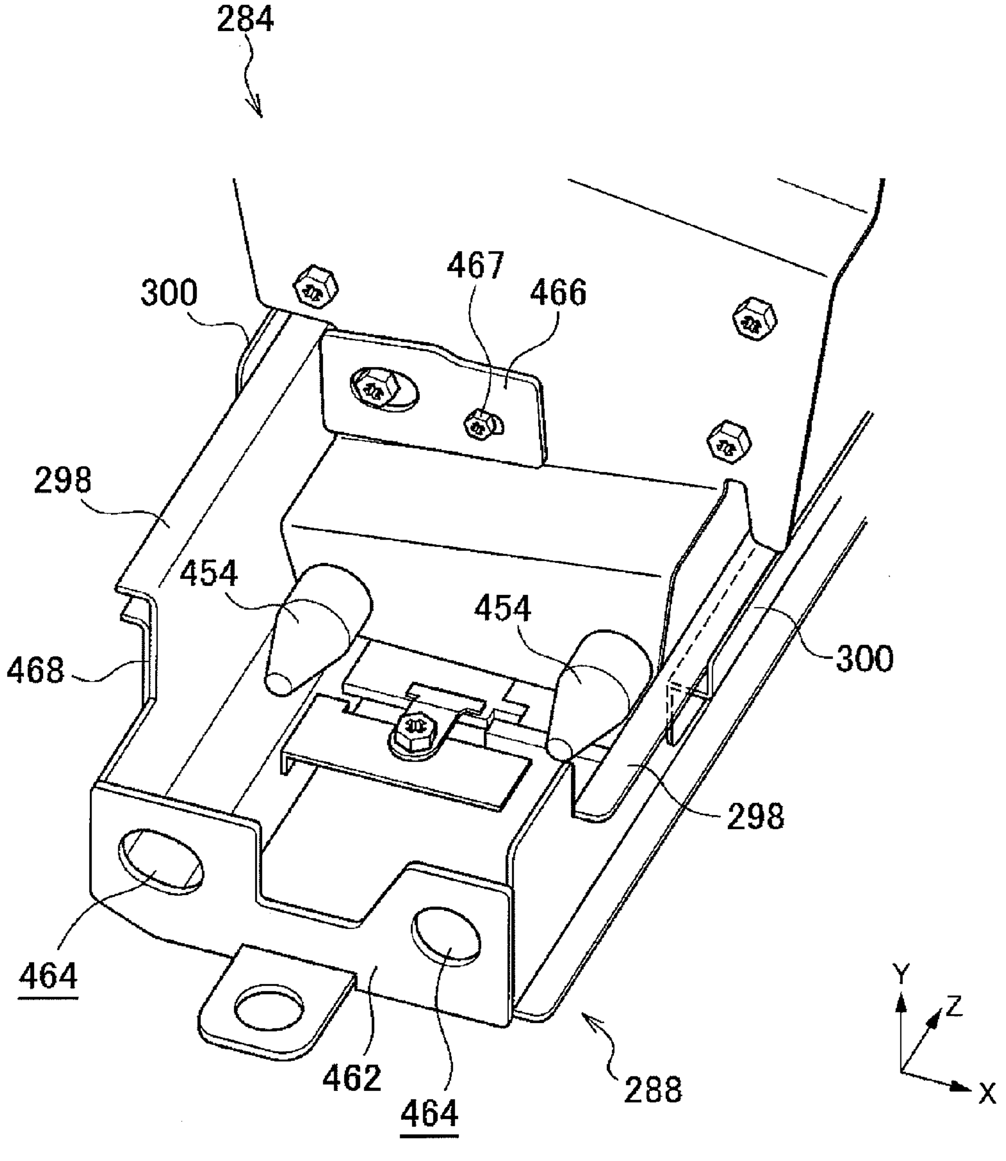
FIG. 14 is a perspective view showing a state in the midst of installing the lamp housing and the window cover of the inline sensor relating to the exemplary embodiment of the present invention.

As shown in FIG. 13A and FIG. 13B, the window cover 288 can be installed at and removed from the lamp housing 284. Concretely, the X-Y sectional configuration of the window cover 288 is substantially shaped as the letter "U" that opens upward. Sliders 298, which serve as a pair of guided portions, are provided at edge portions of this opening. The sliders 298 fit-together with rails 300 that serve as an example of guiding portions and that are formed at the lamp housing 284. Due thereto, as shown in FIG. 14, the sliders 298 move while being guided by the rails 300, and the window cover 288 is installed at and removed from the lamp housing 284 in the Z direction. Accordingly, at the inline sensor 200, the window cover 288 can be replaced or cleaned as a single part.

Note that, as shown in FIG. 3, the window cover 288 is structured such that its own edges and the edges of the window glass 286 do not face toward the upstream side in the conveying direction of the recording medium P. In the state in which the window glass 286 closes a window portion 288A that is formed in the window cover 288, the both longitudinal direction ends of the window glass 286 are pushed against the window cover 288 by mounting springs (not shown). Namely, the window glass 286 is structured so as to be able to be installed at and removed from the window cover 288. Accordingly, at the inline sensor 200, the window glass 286 can also be replaced or cleaned as a single part.

(Placement of Lower Unit and Window Cover)

As shown in FIG. 13A and FIG. 13B, two positioning holes 464 are provided in a front plate 462 that serves as a positioned portion at the front side of the window cover 288. One of the two positioning holes 464 is a long hole that is long in the X direction. Further, as shown in FIG. 14, when the window cover 288 is to be installed at the lamp housing 284, the positioning pins 454 are fit into the positioning holes 464, and the position of the window cover 288 in the X direction and the Y direction with respect to the lamp housing 284 is determined at the front side. Note that, after installation, due to a cover stop plate 466 (shown in FIG. 14) provided at the lamp housing 284 being slid to a position of catching on a cut-out portion 468 at a side plate of the window cover 288, the window cover 288 does not come apart from the lamp housing 284. Concretely, after the window cover 288 is installed at the lamp housing 284, a screw 467 is temporarily loosened, the cover stop plate 466 is slid to the position of catching on the cut-out portion 468, the screw 467 is fastened again, and the cover stop plate 466 is fixed. Due thereto, the window cover 288 does not come apart from the lamp housing 284.

On the other hand, as described above, when the lower unit 250 is to be installed at the center unit 246, the positioning pins 454 are fit also into the positioning holes 452 of the front cover 450 of the lower unit 250. Namely, at the front side, the window cover 288 and the lower unit 250 are positioned by the common positioning pins 454, and therefore, the window cover 288 is disposed with good positional accuracy with respect to the lower unit 250.

Figure 15:
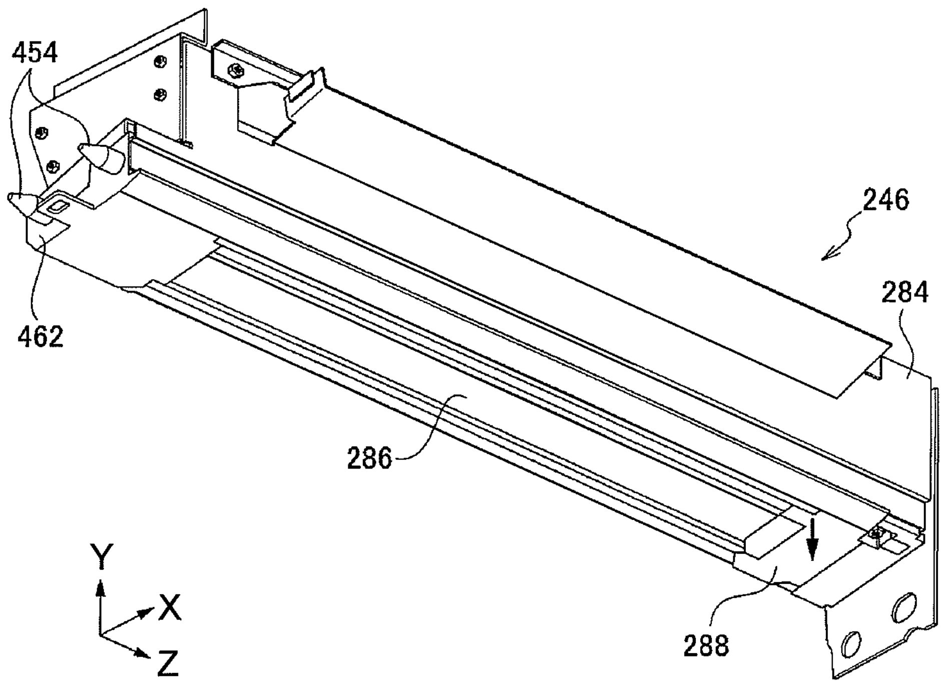
FIG. 15 is a perspective view showing a state in which the lamp housing and the window cover of the inline sensor relating to the exemplary embodiment of the present invention are installed.

As shown in FIG. 13A and FIG. 13B, an urging block 470 serving as an example of an urging portion is provided at the interior of the lamp housing 284. The one urging block 470 is provided in a vicinity of the center in the X direction and at the rear side in the Z direction. The urging block 470 generates urging force directed downwardly in the Y direction, due to a compression spring (not shown) that is provided within the urging block 470. As shown in FIG. 15, in the state in which the window cover 288 is installed at the lamp housing 284, the urging block 470 urges the window cover 288, from the inner side, downwardly in the Y direction.

Figure 16:
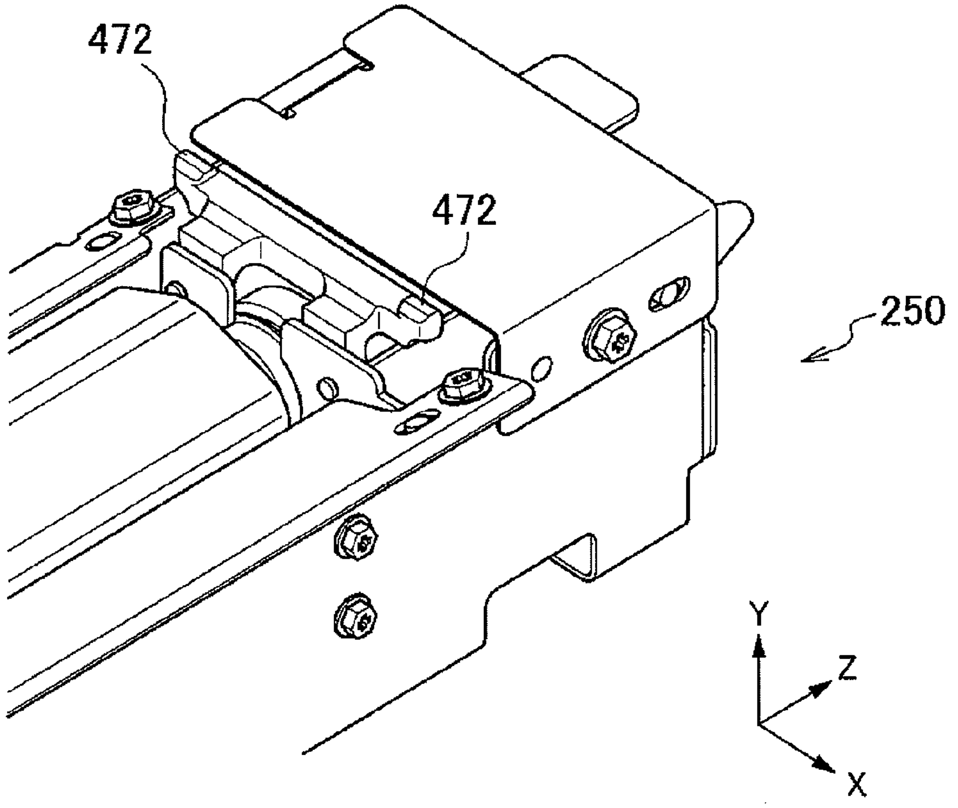
FIG. 16 is a perspective view showing an upper surface portion of a lower housing of the inline sensor relating to the exemplary embodiment of the present invention.

On the other hand, as shown in FIG. 16, two prescribing portions 472, which serve as an example of a positioning portion, are provided at the top surface at the rear side of the lower unit 250, so as to be lined-up in the X direction. Each of the prescribing portions 472 projects out by a predetermined distance, e.g., 2 mm, in the perpendicular direction from the reading surface of the recording medium P, and are datums that prescribe the position of the window cover 288 that is to be disposed at the upper portion of the lower unit 250. Further, in the state in which the lower unit 250 is installed at the center unit 246, the window cover 288 is pushed against the prescribing portions 472 by the urging block 470.

Accordingly, at the rear side, the window cover 288 is urged toward and pushed against the prescribing portions 472 that serve as datums and that are provided at the lower unit 250. Therefore, the window cover 288 is disposed with good positional accuracy in the Y direction with respect to the lower unit 250.

Figure 17A:
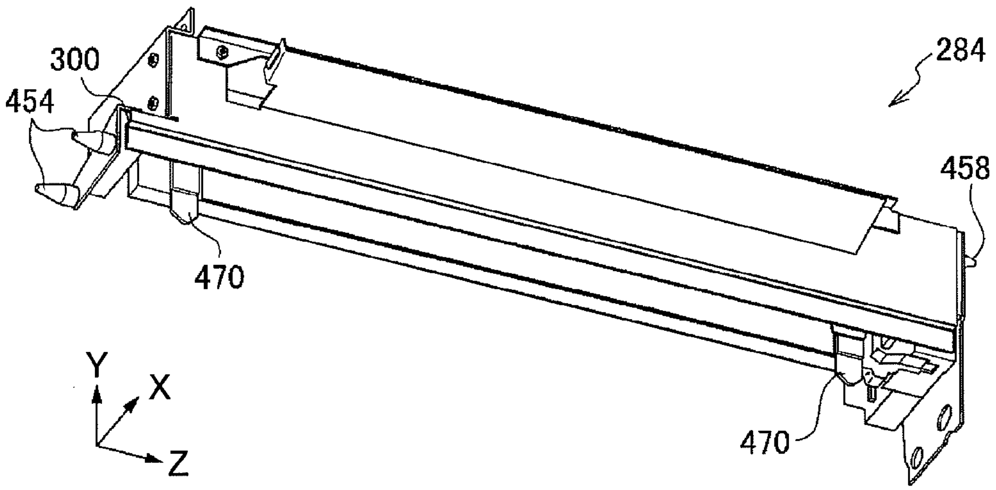
FIG. 17A is a perspective view showing a modified example of the lamp housing of the inline sensor relating to the exemplary embodiment of the present invention.
Figure 17B:
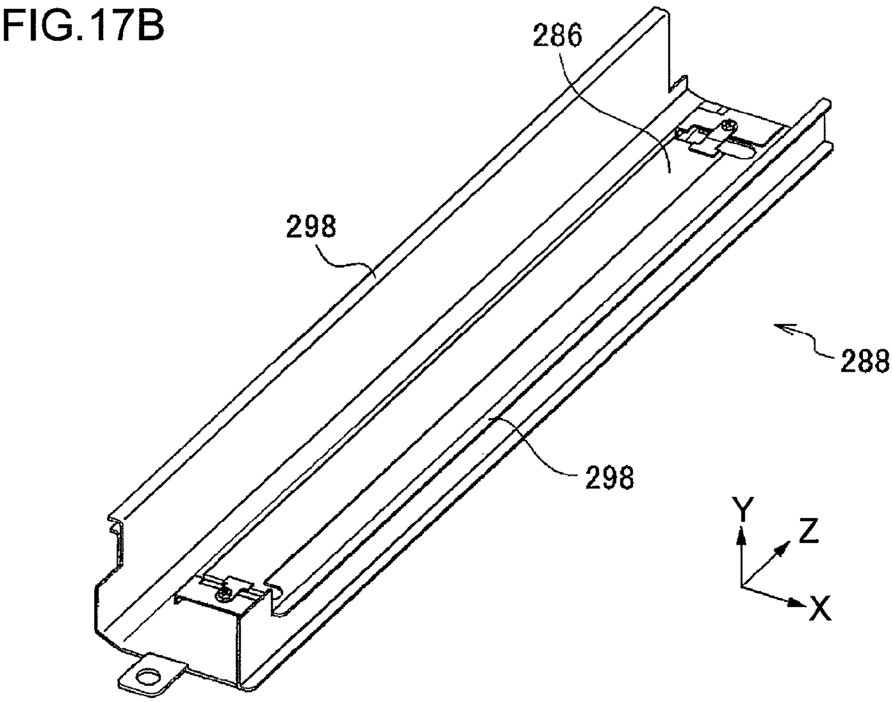
FIG. 17B is a perspective view showing a modified example of the window cover of the inline sensor relating to the exemplary embodiment of the present invention.
Figure 18:
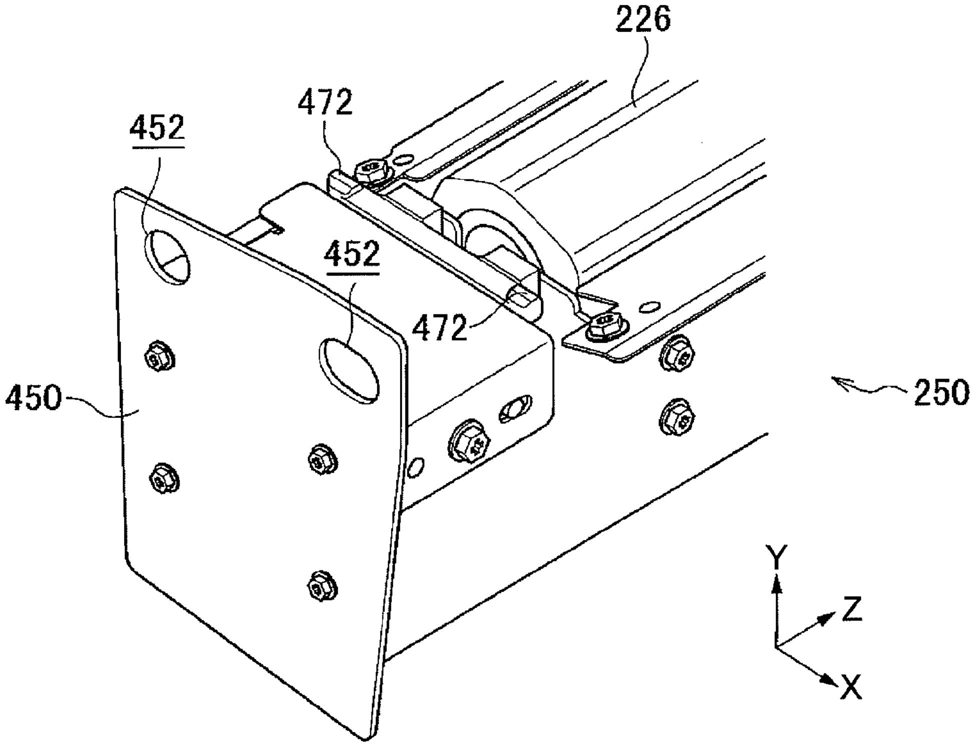
FIG. 18 is a perspective view showing a modified example of the upper surface portion of the lower housing of the inline sensor relating to the exemplary embodiment of the present invention.

Note that, as a modified example of this exemplary embodiment, as shown in FIG. 17A, FIG. 17B and FIG. 18, instead of eliminating the front plate 462 of the window cover 288, the urging block 470 may be provided at the front side as well, and the prescribing portions 472 that serve as datums may be provided also at the top surface of the front side of the lower unit 250. In this case, the window cover 288 is, at the front side and the rear side, pushed against the prescribing portions 472 serving as datums by the urging blocks 470. Therefore, the window cover 288 is disposed with good positional accuracy in the Y direction with respect to the lower unit 250.

Further, as another modified example, although not illustrated, instead of eliminating the urging block 470, a rear plate, that runs along the rear cover 424 of the center unit 246, may be provided also at the rear side of the window cover 288, and positioning holes may be provided in this rear plate, and, when the lower unit 250 is to be installed at the center unit 246, the positioning pins 458 formed at the rear cover 456 of the lower unit 250 may be inserted into the positioning holes 460 of the center unit 246 and inserted also into the positioning holes of the window cover 288. In this case, similarly to the window cover 288 and the lower unit 250 being positioned by the common positioning pins 454 at the front side, at the rear side as well, the window cover 288 is positioned by the positioning pins 458 of the lower unit 250. Therefore, the window cover 288 is disposed with good positional accuracy with respect to the lower unit 250.

(Countermeasures to Stray Light)

As shown in FIG. 3, a baffle 304 is provided within the lamp housing 284 so as to surround the optical axis OA above the pair of lamps 212. The baffle 304 is structured to have at least side walls 304S and a bottom wall 304B. In this exemplary embodiment, the pair of side walls 304S are connected by a pair of front and rear walls (not shown) that face in the Z direction. A lower window 304W through which the optical axis OA is incident is formed in the bottom wall 304B. The open end at the upper side of the baffle 304 surrounds the window portion 256A of the imaging system housing 256. Accordingly, the light that proceeds along the optical axis OA passes through the interior of the baffle 304 and is incident in the imaging section 208.

The dimensions and shape of the baffle 304 are set such that the lights, which are illuminated from the reverse sides of the lamps 212, do not reach the window portion 256A. Namely, the position of the opening edge of the lower window 304W is set such that the lights that are illuminated from the reverse sides of the lamps 212 do not directly reach the window portion 256A. Further, the side walls 304S are set to have an inclining angle with respect to OA such that the lights that are illuminated from the reverse sides of the lamps 212 do not reach the window portion 256A even if reflected one time.

Plural partitioning walls 306, that partition the portion other than the light guiding path due to the imaging optical system 206, are disposed within the imaging system housing 256. Each of the partitioning walls 306 has an opening 306A at which the size (upper limit) of the light passage portion is determined in accordance with the diffusion angle of the light reflected by the recording medium P, to the extent that the diffused light reflected at the recording medium P is not narrowed in the Y direction and the Z direction.

(Air Flow)

Further, the duct 308 is formed within the lamp housing 284 by one of the side walls 304S (in the present exemplary embodiment, the side wall 304S at the upstream side in the conveying direction of the recording medium P) and the peripheral wall of the lamp housing 284. In the state in which the lamp housing 284 is installed at the upper housing 254, the open end at the upper side of the duct 308 is connected to the duct 265 through the connection port 266B. Due thereto, the air flow generated by the operation of the fan 270, is generated within the lamp housing 284 as well.

An air discharge port 310 is formed at a portion, of a peripheral wall of the lamp housing 284, which portion is at a position at the side opposite the duct 308 side in the X direction. Accordingly, within the lamp housing 284, the air flow from the duct 265, while being guided by the peripheral walls of the lamp housing 284 and the window cover 288, flows via the first lamp 212A at the upstream side in the conveying direction of the recording medium P and the second lamp 212B at the downstream side, and passes through the air discharge port 310 and is discharged to the exterior of the lamp housing 284.

An overhanging portion 312, that is for keeping the light illuminated from the reverse side of the first lamp 212A from reaching the lower window 304W, overhangs out from the lower end of the side wall 304S that structures the duct 308. The overhanging amount of the overhanging portion 312 is set such that the cooling effects with respect to the pair of lamps 212 by the air flow to the lamps 212 are equal.

(Light Amount Narrowing Portion)

The light amount narrowing portion 224 has a side wall 224S, an upper wall 224U, and a lower wall 224L. The X-Y cross-sectional configuration of the light amount narrowing portion 224 is, in cross-section, a substantial "U" shape that opens toward the third mirror 218 side. A opening portion 314 that is substantially rectangular is formed in the side wall 224S of the light amount narrowing portion 224. A rib 316 hangs down from the free end of the upper wall 224U. The light amount narrowing portion 224 is structured so as to, by a lower edge 314L of the opening portion 314 and a lower end 316L of the rib 316, cut the light from the recording medium P and narrow the light amount in the Y direction.

One longitudinal direction end of the light amount narrowing portion 224 reaches the near side wall of the imaging system housing 256. An adjustment lever 474 (see FIG. 5) is mounted to this one longitudinal direction end of the light amount narrowing portion 224 through an operation hole formed in the wall.

The light amount narrowing portion 224 rotates in accordance with operation of the adjustment lever 474, and is moved gradually from an initial position, at which the light amount is narrowed most, toward a posture of decreasing the narrowed amount.

(Jam Suppressing Structure)

Figure 19:
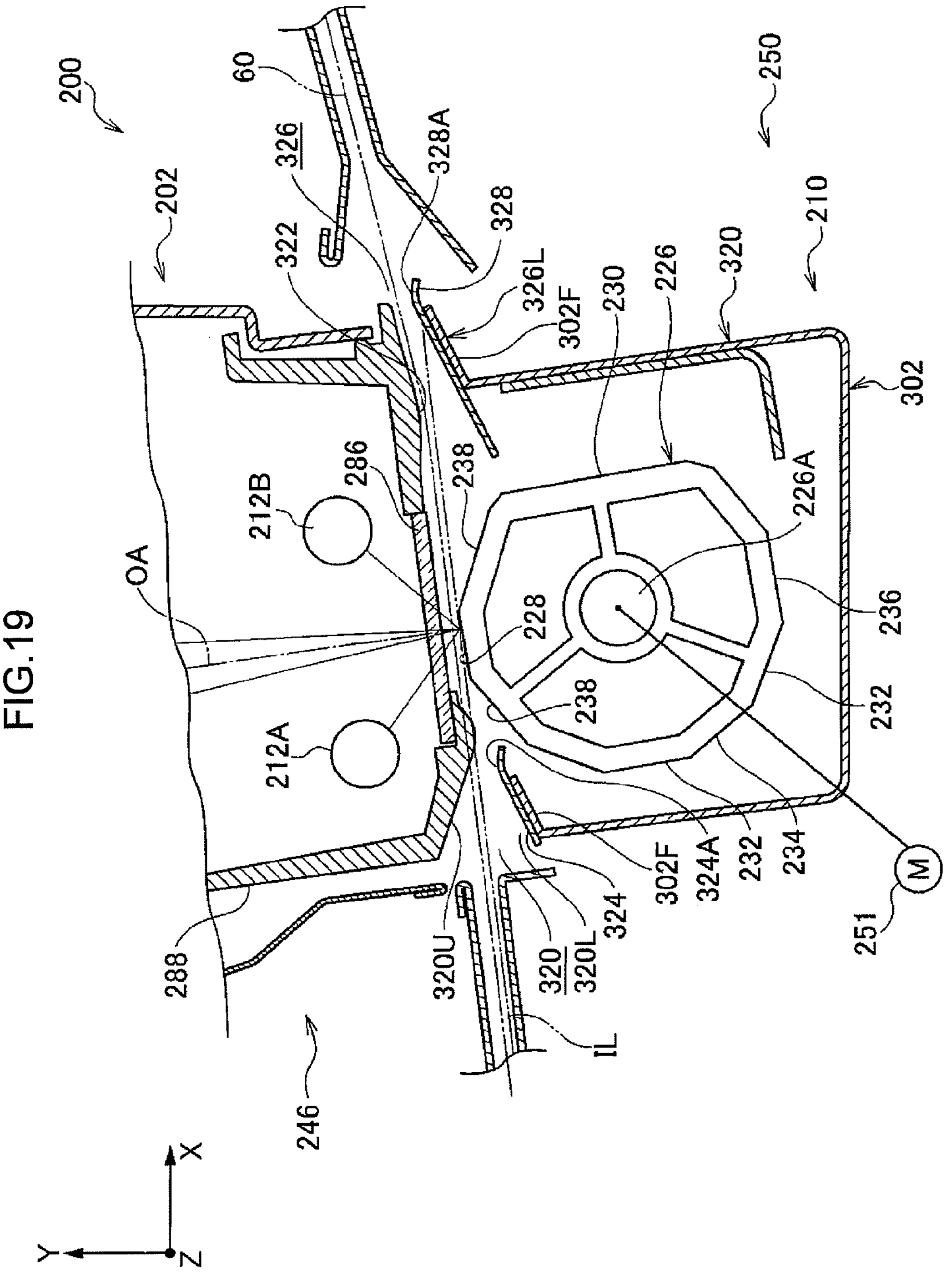
FIG. 19 is a sectional view showing, with the center being a conveying path of a recording medium, the center unit and the lower unit of the inline sensor relating to the exemplary embodiment of the present invention.

As shown in FIG. 19, the conveying path 60 between the center unit 246 (the illuminating section 202) and the lower unit 250 (the setting section 210) is structured so as to become higher toward the conveying direction downstream side of the recording medium P. The respective corner portions of the window cover 288 and the lower housing 302 are subjected to chamfering or rounding processing. Due thereto, an entrance chute 320, that is a lead-in portion that is directed toward the upstream side in the conveying direction of the recording medium P, is formed at the inline sensor 200.

An upper chute 320U that forms the upper portion of the entrance chute 320 is structured by a smooth curved surface that is convex downward. Given that an extended line of the detection reference surface 228 of the reference roller 226 as seen from the Z direction in a state in which the detection reference surface 228 faces the conveying path 60 side of the recording medium P is IL, the dimensions and the shape of the upper chute 320U are set such that the upper chute 320U interferes with the extended line IL (the projecting end of the upper chute 320U is positioned at the lower side of the extended line IL).

Further, a convex portion 322, that is structured by a smooth curved surface that is convex downward, is formed at the window cover 288, further toward the conveying direction downstream side of the recording medium P than the window glass 286. The convex portion 322 is positioned at the upper side of the extended line IL.

A lower chute 320L that forms the lower portion of the entrance chute 320 is nearer to the reference roller 226 due to a lower chute member 324 that is fixed to a flange 302F that extends inwardly from the open end of the lower housing 302. The downstream end in the conveying direction of the recording medium P of the lower chute member 324 is a rounded portion 324A that is rounded so as to be convex upward.

On the other hand, an exit chute 326 is formed between the lower housing 302 and the recording medium P conveying direction downstream side portion of the convex portion 322. A lower chute 326L that forms the lower portion of the exit chute 326 is structured by a lower chute member 328 being fixed to the flange 302F that extends outwardly from the open end of the lower housing 302. The downstream end in the conveying direction of the recording medium P of the lower chute member 328 is a rounded portion 328A that is rounded so as to be convex upward.

When an image is detected by the CCD sensor 204, the detection reference surface 228 of the reference roller 226 is directed toward the recording medium P side in a posture of being substantially parallel to the window glass 286. The respective guide surfaces 238, that are provided at the both sides of the detection reference surface 228, receive the recording medium P from the entrance chute 320, and further guide the recording medium P toward the exit chute 326.

On the other hand, when an image is not detected by the CCD sensor 204, the withdrawn surface 230 of the reference roller 226 is directed toward the recording medium P side in a posture of being closer to the window glass 286 the further toward the downstream side in the conveying direction of the recording medium P (a non-parallel posture). The withdrawn surface 230 is a wide surface that extends from the rounded portion 324A of the lower chute member 324 to a vicinity of the exit chute 326. In the above-described posture, the withdrawn surface 230 receives the recording medium P from the entrance chute 320, and further guides the recording medium P toward the exit chute 326.

(Operation of Inline Sensor)

As shown in FIG. 3, the inline sensor 200 illuminates light from the pair of lamps 212 onto the recording medium P that passes between the illuminating section 202 and the setting section 210. The light reflected at the recording medium P is led along the optical path OA to the imaging section 208, and is imaged on the CCD sensor 204 by the imaging optical system 206 of the imaging section 208. The CCD sensor 204 outputs signals, that correspond to the image densities of the respective positions of the image, to the control device 192 of the image forming device 10. The image densities, the image formation positions, and the like are corrected at the control device 192 on the basis of the signals from the CCD sensor 204.

On the other hand, at the time of calibrating the CCD sensor 204 that structures the inline sensor 200, first, the motor of the lower unit 250 is operated, and the white reference surface 232 is directed toward the conveying path 60 of the recording medium P. The CCD sensor 204 is adjusted such that a predetermined signal is outputted.

Next, the combined test surface 236 shown in FIG. 4 is directed toward the conveying path 60 of the recording medium P, and the detection position of the CCD sensor 204 is adjusted such that the interval between the straight line portion 240A and the inclined portion 240B of the position adjustment pattern 240, and the interval between the straight line portion 240C and the inclined portion 240B, become equal. Thereafter, it is confirmed whether or not there is a focus at the CCD sensor 204 such that the ladder pattern can be read. Further, from the depth detection pattern 244, it is confirmed whether or not the output is within a reference range regardless of the illumination depth.

Moreover, the color reference surface 234 is directed toward the conveying path 60 of the recording medium P. The CCD sensor 204 is adjusted such that a predetermined signal is outputted at each color.

As described above, in this embodiment of the present invention, the positioning holes 464, 452, that are positioned by the common positioning pins 454 provided at the lamp housing 284, are provided at the window cover 288 and the lower unit 250. Namely, the window cover 288 and the lower unit 250 are positioned via the common positioning pins 454 of the lamp housing 284. Therefore, the window cover 288 is disposed with good positional accuracy with respect to the lower unit 250.

Further, the lower unit 250 has the prescribing portions 472 that prescribe the position of the window cover 288 in the direction perpendicular to the reading surface of the recording medium P. On the other hand, the lamp housing 284 has the urging block 470 that urges the window cover 288 toward the prescribing portions 472. Therefore, the window cover 288 is disposed with even better positional accuracy with respect to the lower unit 250.

Moreover, the window cover 288 has the sliders 298 that are guided by the rails 300 that guide installation and removal and that are provided at the lamp housing 284. Therefore, the window cover 288 is easily installed at and removed from the lamp housing 284.

Because the image forming device 10 has the inline sensor 200, the toner images can be detected within the device.

Note that, in the present exemplary embodiment, the recording medium P is exposed to light from the obverse side thereof. However, when using a recording medium P through which light is transmitted, the recording medium P may be exposed to light from the reverse side thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A sensing device comprising:

a sensing section having an illuminating section that illuminates light toward a conveying path direction in which a recording medium is conveyed, and a light-receiving section that receives reflected light of light illuminated from the illuminating section, the sensing section sensing an image on the recording medium that is conveyed on the conveying path;

a housing that accommodates the illuminating section;

a covering member, that is removably attached to the housing, having a transmitting member through which the light illuminated from the illuminating section is transmitted, the covering member covering the housing; and a setting section disposed at an opposite side to a housing side with respect to the covering member, the setting section being removably attached to the housing, and having a setting surface that sets a position at which the recording medium reflects light, wherein, at a positioning portion of the setting section, the covering member is positioned at least in a direction perpendicular to the setting surface.

2. The sensing device of claim 1, wherein the covering member and the setting section have a common positioned portion with respect to a positioning portion of the housing, and, the covering member is positioned at least in the direction perpendicular to the setting surface with respect to the setting section.

3. The sensing device of claim 1, wherein the setting section has a prescribing portion that prescribes a position of the covering member in the direction perpendicular to the setting surface, and the housing has an urging portion that urges the covering member toward the prescribing portion.

4. The sensing device of claim 1, wherein the covering member has a guided portion that is guided by a guiding portion that is provided at the housing and guides installation and removal of the covering member.

5. An image forming device comprising a sensing device, the sensing device including:

a sensing section having an illuminating section that illuminates light toward a conveying path direction in which a recording medium is conveyed, and a light-receiving section that receives reflected light of light illuminated from the illuminating section, the sensing section sensing an image on the recording medium that is conveyed on the conveying path;

a housing that accommodates the illuminating section;

a covering member, that is removably attached to the housing, having a transmitting member through which the light illuminated from the illuminating section is transmitted, the covering member covering the housing; and a setting section disposed at an opposite side to a housing side with respect to the covering member, the setting section being removably attached to the housing, and having a setting surface that sets a position at which the recording medium reflects light, wherein, at a positioning portion of the setting section, the covering member is positioned at least in a direction perpendicular to the setting surface.

6. The image forming device of claim 5, wherein the covering member and the setting section have a common positioned portion with respect to a positioning portion of the housing, and, the covering member is positioned at least in the direction perpendicular to the setting surface with respect to the setting section.

7. The image forming device of claim 5, wherein the setting section has a prescribing portion that prescribes a position of the covering member in the direction perpendicular to the setting surface, and the housing has an urging portion that urges the covering member toward the prescribing portion.

8. The image forming device of claim 5, wherein the covering member has a guided portion that is guided by a guiding portion that is provided at the housing and guides installation and removal of the covering member.

* * * * *